(12) United States Patent
Nakajima et al.

(10) Patent No.: US 8,473,086 B2
(45) Date of Patent: Jun. 25, 2013

(54) SUBSTRATE REWORKING BY LIQUID DROP EJECTION MEANS

(75) Inventors: Yoshinori Nakajima, Osaka (JP); Toshihiro Tamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 862 days.

(21) Appl. No.: 12/311,708

(22) PCT Filed: Oct. 12, 2007

(86) PCT No.: PCT/JP2007/069915
§ 371 (c)(1),
(2), (4) Date: Dec. 14, 2009

(87) PCT Pub. No.: WO2008/047695
PCT Pub. Date: Apr. 24, 2008

(65) Prior Publication Data
US 2010/0087945 A1    Apr. 8, 2010

(30) Foreign Application Priority Data
Oct. 17, 2006    (JP) .................................. 2006-283126

(51) Int. Cl.
*G06F 19/00*    (2011.01)
(52) U.S. Cl.
USPC ......................................... 700/105; 700/110
(58) Field of Classification Search
USPC ......................................... 700/105, 110, 121
See application file for complete search history.

(56) References Cited

U.S. PATENT DOCUMENTS

| | | | |
|---|---|---|---|
| 5,301,012 A | | 4/1994 | King et al. |
| 5,714,195 A | * | 2/1998 | Shiba et al. .................... 427/140 |
| 5,831,854 A | * | 11/1998 | Yamamoto et al. .............. 700/95 |
| 6,828,069 B1 | | 12/2004 | Nakazawa et al. |
| 6,872,663 B1 | * | 3/2005 | Okada ............................ 438/694 |
| 7,113,278 B2 | * | 9/2006 | Choo et al. ..................... 356/364 |
| 7,702,486 B2 | * | 4/2010 | Fujiwara et al. ............... 702/185 |
| 2004/0107412 A1 | | 6/2004 | Pack et al. |
| 2005/0037272 A1 | * | 2/2005 | Tanaka ............................ 430/30 |

(Continued)

FOREIGN PATENT DOCUMENTS

| | | |
|---|---|---|
| EP | 2 014 375 | 1/2009 |
| JP | 2005-142521 A | 6/2005 |

(Continued)

OTHER PUBLICATIONS

Extended European Search Report mailed Dec. 5, 2011, in corresponding European Patent Application No. 07829651.4.

(Continued)

*Primary Examiner* — Ryan Jarrett
(74) *Attorney, Agent, or Firm* — Edwards Wildman Palmer LLP; George W. Neuner

(57) ABSTRACT

A substrate reworking system (1) improves rework tact time and eliminates unnecessary reworking to perform efficient reworking. The system (1) includes: a defect information acquisition unit (2) for acquiring defect information for an entire region on the target substrate (9); a reworking unit (3) having at least one liquid drop discharge unit (6) for dispensing a liquid drop to a defective part on the target substrate (9) based on the defect information acquired by the defect information acquisition unit (2); and a rework determining unit (4) for determining, for each target substrate (9) and based on the defect information acquired by the defect information acquisition unit (2), whether the reworking unit (3) needs to perform reworking.

8 Claims, 19 Drawing Sheets

U.S. PATENT DOCUMENTS

2005/0041006 A1 2/2005 Lee et al.
2005/0216877 A1 9/2005 Pack et al.
2006/0226865 A1* 10/2006 Gallarda et al. .............. 324/770
2007/0266364 A1 11/2007 Pack et al.

FOREIGN PATENT DOCUMENTS

| | | |
|---|---|---|
| JP | 2005-185978 | 7/2005 |
| JP | 2006-108151 A | 4/2006 |
| JP | 2006-159185 A | 6/2006 |
| WO | 2004/008246 A2 | 1/2004 |

OTHER PUBLICATIONS

International Search Report for PCT/JP2007/069915.

* cited by examiner (a)

(b)

(a)

(b)

(a)

(b)

SUBSTRATE REWORKING BY LIQUID DROP EJECTION MEANS

CROSS-REFERENCE TO RELATED APPLICATIONS

This application is the National Stage of PCT/JP2007/069915, filed Oct. 12, 2007, which claims the benefit of Japanese Application 2006-283126, filed Oct. 17, 2006. The entire contents of each of these applications is incorporated herein by reference.

TECHNICAL FIELD

The present invention relates to substrate reworking systems with a reworking function whereby rework sites scattered across a substrate are reworked by inkjet technology, and also to associated substrate reworking methods, computer programs, and computer-readable storage media.

BACKGROUND ART

Demand is increasing in recent years for liquid crystal and electroluminescence (EL) display devices which have a large display area. A similar trend is found in the manufacture of these devices where multiple display devices are collectively fabricated from a single large-area substrate to reduce cost.

In addition, consumers like high quality display devices capable of producing a display that exhibits superior color uniformity with no dark spots or excess brightness (white) dots which are caused by defective display pixels.

It is however technically impossible, for example, to fabricate all defect-free pixels across the LCD color filter (CF) substrate or the EL substrate. It is also extremely difficult to manufacture display devices which have zero dark spots or excess brightness dots.

A known approach to these issues is to manufacture and inspect a large-area CF or EL substrate by conventional technology wherein defective pixels are subsequently reworked by dropwise dispensing of correction liquid by inkjet technology. See, for example, patent literature 1. The technology serves to produce large-area CF and EL substrates with no defective pixels and thus to produce high quality display devices.

Another approach employs inkjet technology not only for the reworking of defective pixels, but for the manufacture of the CF/EL substrate. Inkjet is also used to rework defects which occur during the manufacture. The technology is implementable by a single device which, to manufacture a defect-free substrate, incorporates a wide-array inkjet printhead capable of dispensing liquid drops across the substrate, a mechanism for detecting defective pixels from the dropwise dispensing by the wide-array inkjet printhead, and an inkjet printhead for reworking pixels which have been determined to be defective. See, for example, patent literature 2.

The reworking device described in patent literature 1 includes a defect detector, a laser projector, and an inkjet-based defect reworking unit. The device is capable of reworking defects on the substrate.

Patent literature 2 employs a supplementary inkjet device for reworking defects attributable to improper ejection by the wide-array inkjet printhead, so that a single device can produce a defect-free substrate. Meanwhile, there is strong demand for a high speed reworking process to further push the recent cost-cutting trend in display device manufacturing.

CITATION LIST

Patent Literature 1: Japanese Patent Application Publication, Tokukai, No. 2001-66418 (Publication Date: Mar. 16, 2001)
Patent Literature 2: Japanese Patent Application Publication, Tokukai, No. 2005-185978 (Publication Date: Jul. 14, 2005)

SUMMARY OF INVENTION

The device of patent literature 1 detects a defect, removes the defect by laser, and performs the rework. This series of steps is repeated for each defective pixel until they are all reworked no matter how many defects exist on the substrate. Therefore, it takes a significant amount of time to complete the reworking across the substrate, which adds to the cost.

Lack of color uniformity and other problems could still occur with this device, depending on how defects (reworked pixels) are located. Some substrates may remain of substandard quality even after reworking. Stated another way, the device may repair substrates which will later turn out unworthy of reworking.

Although criteria may differ from one set of product specifications (tolerance specifications) to the other, substrate is generally considered as being below acceptable quality due to lack of color uniformity or another problem if, for example, reworked pixels are located at high concentration in a particular part of the substrate, scattered along one line, or found in a regular pattern.

The device of patent literature 2 is able to eliminate defects attributable to improper ejection. Pixel defects however can occur during baking. It is therefore impossible to manufacture a substrate including no defective pixels at all, and another reworking process is needed. A pixel defect that may happen in baking is, for example, failure to achieve desired color reproducibility due to color mixture between adjacent pixels filled with different liquid drops which results from reduced surface tension of the drops under baking heat.

In addition, while detecting pixels where the wide-array inkjet printhead has failed to properly dispense liquid drops, no other processes (in which the wide-array inkjet printhead could dispense liquid drops to another substrate or rework a target substrate, for example) can be carried out. The detection process requires dedicated use of the device for an extended period of time.

The present invention, accordingly, has an objective of providing a substrate reworking system with improved rework tact time which avoids unnecessary reworking to achieve an efficient reworking process.

A substrate reworking system in accordance with the present invention is, to address the problems, characterized in that it includes: defect information acquisition means for acquiring defect information for an entire region on a target substrate; reworking means including at least one liquid drop ejection means for dispensing a liquid drop to a defective part on the target substrate based on the defect information acquired by the defect information acquisition means; and rework determining means for determining, for each target substrate and based on the defect information acquired by the defect information acquisition means, whether the reworking means needs to perform reworking.

According to the features, the defect information acquisition means single-handedly acquires defect information for an entire region on a target substrate so that the rework determining means can determine from the defect information whether each substrate needs to be reworked. The system can exclude, from reworking, those substrates which should not be reworked because the reworking would take a significant amount of time or fail to sufficiently address lack of color uniformity. Rework efficiency is thus improved.

The substrate reworking system in accordance with the present invention is preferably such that: the liquid drop ejection means includes a plurality of individual moveable liquid drop ejection means; and the rework determining means includes assigning means for distributing the defect information acquired by the defect information acquisition means among the plurality of liquid drop ejection means and determining means for determining, based on the defect information distributed by the assigning means, whether the reworking is needed.

According to the arrangement, the reworking means includes a plurality of liquid drop ejection means, such as inkjet printheads, so that the plurality of liquid drop ejection means cooperatively reworks the defects across the substrate, thereby reducing tact time in the reworking. Also, each liquid drop ejection means determines, based on the state of the assigned defects (for example, number and positions), whether the substrate itself needs reworking. It is thus reliably determined whether each substrate needs reworking.

The substrate reworking system in accordance with the present invention preferably further includes substrate transport means including: first transport means for transporting the target substrate from the defect information acquisition means to the reworking means; and second transport means for transporting the target substrate from the defect information acquisition means to defective substrate storage means, wherein the substrate transport means selects the first transport means and the second transport means based on a result of the determination made by the rework determining means.

According to the arrangement, after the defect information acquisition means acquires defect information for the target substrate. Based on that defect information, the defective substrate can be fed selectively either to the defective substrate storage means where the substrate will be temporarily or permanently stored or to the reworking means where the substrate will be reworked. Multiple substrates can be efficiently processed. In addition, the system is able to acquire defect information for a substrate while reworking another substrate. Tact time is thus reduced.

The substrate reworking system in accordance with the present invention is preferably such that the rework determining means determines, based on either a defect count or a maximum defect concentration in the target substrate calculated from the defect information, whether the reworking is needed.

According to the arrangement, the system is able to exclude, based on the defect information, those substrates which are not worth reworking from reworking. The reworking is thus performed efficiently.

The substrate reworking system in accordance with the present invention is preferably such that the rework determining means determines, based on a rework time of the reworking means estimated based on the defect information, whether the reworking is needed.

According to the arrangement, the time which will be taken by reworking can be estimated in advance based on the defect information prior to the reworking by the reworking means. The system can thus exclude a target substrate from reworking if it takes longer than or equal to a predetermined period of time to rework the substrate. The reworking is thus performed efficiently.

The substrate reworking system in accordance with the present invention is preferably such that: the rework determining means includes: identifying means for identifying a defect to be reworked by the liquid drop ejection means based on the defect information; and calculation means for estimating a time interval between a first ejection timing and a next, second ejection timing for the liquid drop ejection means; and the rework determining means determines, based on the time interval, whether the reworking is needed.

According to the arrangement, for example, when an inkjet printhead is employed as the reworking means, the system reworks only substrates for which a non-ejection time, estimated by the calculation means, during which no liquid drops are ejected is less than or equal to a value where liquid drops can subsequently ejected. The reworking means can perform reworking with improved reliability.

The substrate reworking system in accordance with the present invention is preferably such that the rework determining means determines, based on an assigned defect count per liquid drop ejection means, whether the reworking is needed.

According to the arrangement, no complex determination is needed even when the reworking means containing a plurality of liquid drop ejection means is used to for reworking. Simple, convenient, and very quick computation is possible. It is thus efficiently determined whether the substrate needs reworking.

A method of reworking a substrate in accordance with the present invention is, to address the problems, characterized in that it includes the steps of: acquiring defect information for an entire region on a target substrate; determining, for each target substrate and based on the defect information, whether the target substrate needs to be reworked; and dispensing, based on the defect information, the liquid drop to a defective part on the target substrate determined to need to be reworked.

According to the features, defect information for an entire region on a target substrate is collectively acquired so that it can be determined from the defect information whether each substrate needs to be reworked. The system can exclude, from reworking, those substrates which should not be reworked because the reworking would take a significant amount of time or fail to sufficiently address lack of color uniformity. Rework efficiency is thus improved.

A program in accordance with the present invention is, to address the problems, characterized in that it implements, on a computer, the steps of: acquiring defect information for an entire region on a target substrate; determining, for each target substrate and based on the defect information, whether the target substrate needs to be reworked; and dispensing, based on the defect information, the liquid drop to a defective part on the target substrate determined to need to be reworked.

A computer-readable storage medium in accordance with the present invention is characterized in that it contains a program for implementing, on a computer, the steps of: acquiring defect information for an entire region on a target substrate; determining, for each target substrate and based on the defect information, whether the target substrate needs to be reworked; and dispensing, based on the defect information, the liquid drop to a defective part on the target substrate determined to need to be reworked.

BRIEF DESCRIPTION OF DRAWINGS

FIG. 1 is a block diagram of a substrate reworking system of embodiment 1, (a) showing its configuration in a schematic fashion and (b) showing it in a more concrete fashion.

FIG. 2 is a flow chart depicting an operation of the substrate reworking system.

FIG. 3 is a flow chart depicting another operation of the substrate reworking system.

FIG. 4 is an oblique view of the structure of a reworking unit provided in the substrate reworking system.

FIG. 5 is a schematic cross-sectional view illustrating operations of a printhead gantry unit and a substrate reworking stage provided in the reworking unit, (a) showing an operation and (b) showing another.

FIG. 6 is an illustration of the structure of the printhead gantry unit, (a) being a plan view of its major components and (b) being a front view of them.

FIG. 7 is a side view of major components of a liquid drop discharge unit provided in the printhead gantry unit, illustrating the structure of the liquid drop discharge unit.

FIG. 8 is a front view of major components of a liquid drop discharge unit moving mechanism provided in the printhead gantry unit, illustrating the structure of the mechanism.

FIG. 9 is an illustration of structures of the liquid drop discharge unit, (a) showing the bottom face of major components in one structure and (b) showing it in another structure.

FIG. 10 is a plan view depicting alignment operations by the reworking unit, (a) showing a operation and (b) showing another.

FIG. 11 is a plan view depicting reciprocating motions of printhead gantry unit provided in the reworking unit, (a) showing a motion and (b) showing another.

FIG. 12 is a plan view depicting operations carried out by the printhead gantry unit on a target substrate, (a) showing an operation and (b) showing another.

FIG. 13 is a schematic plan view depicting ejection steps carried out by the liquid drop discharge unit on a deficient part, (a) to (d) each showing a different ejection step.

FIG. 14 is a flow chart depicting the distributing of defect information carried out by an assigning section provided in the reworking unit.

FIG. 15 is a plan view of a substrate depicting the distributing of defect information for each liquid drop discharge unit carried out by a rework determining unit provided in the reworking unit, (a) being a plane view of the substrate and (b) showing a plane view of the liquid drop discharge units and the substrate.

FIG. 16 is a schematic illustration of an example in which a determination is made by the rework determining unit.

FIG. 17 is a flow chart depicting, as an example, an operation in a determining section provided in the reworking unit.

FIG. 18 is a block diagram of a substrate reworking system of embodiment 2, showing its configuration in a concrete fashion.

FIG. 19 is a flow chart depicting an operation of the substrate reworking system.

REFERENCE SIGNS LIST

1 Substrate Reworking System
2 Defect Information Acquisition Unit (Defect Information Acquisition Means)
3 Reworking Unit (Reworking Means)
4 Rework Determining Unit (Rework Determining Means)
5 Substrate Transport Unit (Substrate Transport Means)
6 Liquid Drop Discharge Unit (Liquid Drop Ejection Means)
7 Assigning Section (Assigning Means)
8 Defect
9 Substrate (Target Substrate)
10 Determining Section (Determining Means)

DESCRIPTION OF EMBODIMENTS

The following will describe embodiments of the present invention in reference to FIGS. 1 to 19.

Embodiment 1

<Overall Configuration of Reworking System>
(System Configuration Example 1)

Figure 1:
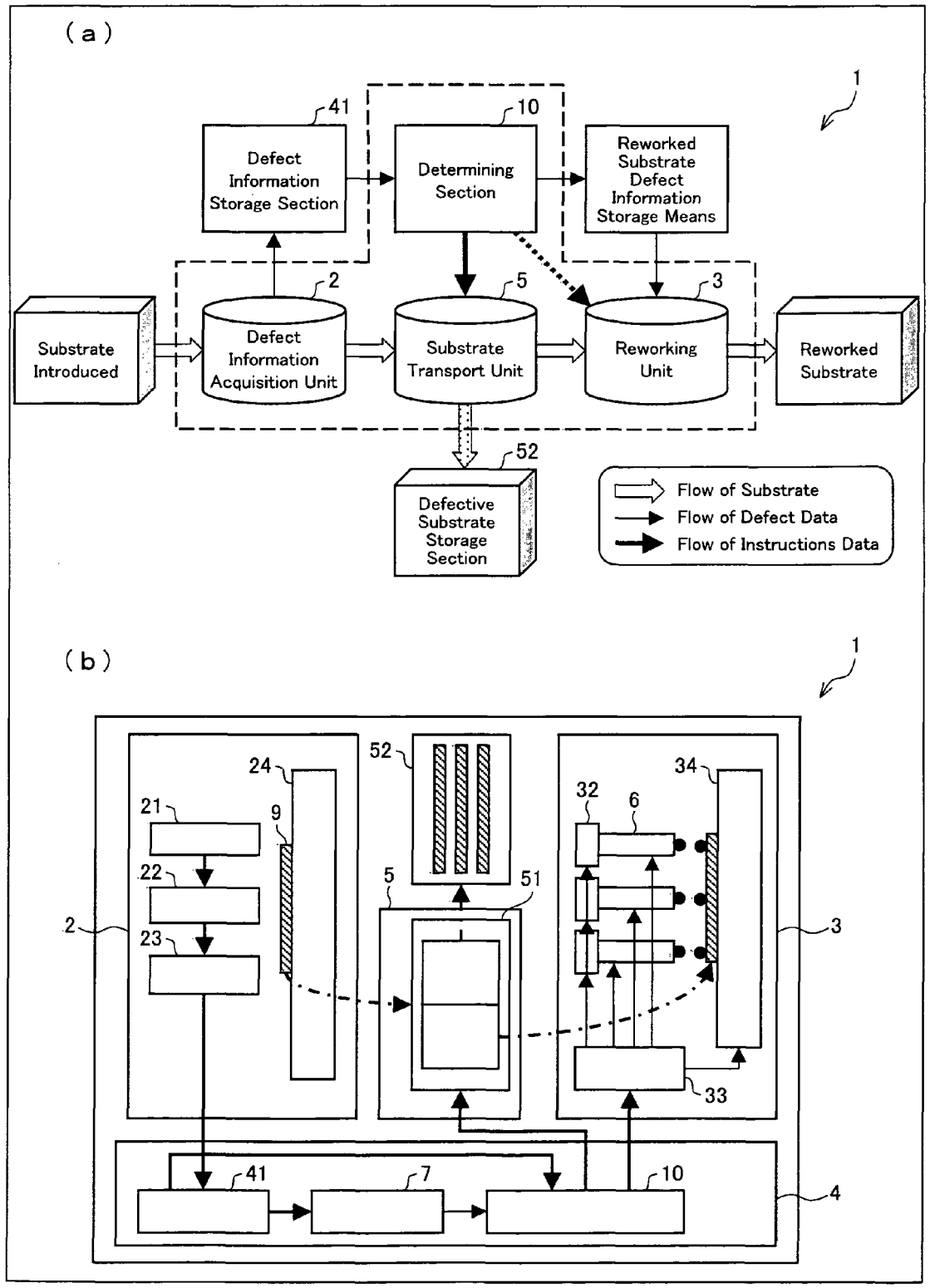
FIG. 1

(a) of FIG. 1 is a block diagram of a substrate reworking system 1 in accordance with the present embodiment, showing its configuration in a schematic fashion. (b) of FIG. 1 is a block diagram of the system 1, showing the configuration in a more concrete fashion. Referring to (a) and (b) of FIG. 1, the substrate reworking system 1 includes a defect information acquisition unit 2, a reworking unit 3, a rework determining unit 4, and a substrate transport unit 5.

A substrate 9 (for example, a color filter substrate or an EL substrate) is prepared in another manufacturing device (not shown). The substrate 9, as being fed to the substrate reworking system 1, is first mounted to a substrate inspection stage 24 in the defect information acquisition unit 2. After a predetermined operation is completed in the defect information acquisition unit 2, the substrate 9 is handed over to a substrate sorting section 51 in the substrate transport unit 5 as indicated by a broken line in the figure. Based on either an instruction or information from the rework determining unit 4, the substrate sorting section 51 either hands the substrate 9 over to a defective substrate storage section 52 or to a substrate reworking stage 34 in the reworking unit 3 for reworking therein. After completing the rework in the reworking unit 3, the substrate 9 is introduced to a baking oven (not shown) to cure correction liquid. The substrate reworking system 1 of the present embodiment may additionally include the baking oven.

The defect information acquisition unit 2 includes a defect detector 21, a laser-based defect removal device 22, a defect information acquisition device 23, and a substrate inspection stage 24 on which the substrate 9 is placed. The substrate inspection stage 24 can move in the X and Y directions and an in-plane rotational direction and controllably driven, for example, by a linear guide to which a linear encoder is mounted so that accurate data on amounts of movement can be output. The moving the defect detector 21, the laser-based defect removal device 22, and the defect information acquisition device 23 may be each positioned at any place on the substrate inspection stage 24.

In (b) of FIG. 1, the flow of information on defects of the substrate 9 is indicated by arrows. In the defect information acquisition unit 2, the defect detector 21 identifies the positions of defective pixels (caused by, e.g., contamination with dust, lack of color, and color mixture) across the substrate 9 and outputs information on the positions to the laser-based defect removal device 22. The laser-based defect removal device 22 then fabricates the defective pixels into substantially identically shaped dents. Thereafter, in reference to the position information from the defect detector 21, the defect information acquisition device 23 precisely measures the positions of the dents formed out of the defective pixels in relation to two reference marks on the substrate 9 and stores results in the defect information storage section 41 in the rework determining unit 4. The defect information acquisition device 23 is also capable of acquiring information on the colors of the dents.

The rework determining unit 4 is, for example, an ordinary computer. The defect information storage section 41 is, for example, computer memory. The defect information in the defect information storage section 41 is fed to an assigning section 7 which distributes, to each liquid drop discharge unit 6, information on the defects which the unit 6 is to rework, on the basis of a movable area on the substrate for the units 6. The assigning section 7 is, for example, a computation program installed in a computer.

The determining section 10 performs computation based on the defect information from the defect information storage section 41 and the defect information from the assigning section 7 on the defects which the individual liquid drop discharge units are to rework, to determine if the target substrate 9 needs reworking and send a result to the substrate sorting section 51 in the substrate transport unit 5. The determining section 10 is, for example, a computation program installed in a computer.

The substrate transport unit 5 is, for example, an ordinary substrate transport robot. The substrate sorting section 51 transports the substrate 9 to either the substrate reworking stage 34 or the defective substrate storage section 52 on the basis of the result. The substrate transport unit 5 includes a transport path A (first transport means) through which the target substrate 9 is transported from the defect information acquisition unit 2 to the reworking unit 3 and a transport path B (second transport means) through which the target substrate 9 is transported from the defect information acquisition unit 2 to the defective substrate storage section 52. The first and second transport means may consist of, for example, a single substrate transport robot switching between the transport paths A and B.

The reworking unit 3 includes the liquid drop discharge units 6, liquid drop discharge unit moving mechanisms 32, a control section 33, and the substrate reworking stage 34. Each liquid drop discharge unit 6 is paired up with one of the liquid drop discharge unit moving mechanisms 32, with the reworking unit 3 including multiple pairs of them (three pairs in FIG. 1). The substrate reworking stage 34 is capable of moving uniaxially and in in-plane rotational direction and controllably driven, for example, by a linear guide to which a linear encoder is mounted so that accurate data on amounts of movement can be output. The substrate reworking stage 34 moves in the in-plane rotational direction only when controlling the orientation of the substrate. In the reworking, the stage 34 reciprocates uniaxially. Each liquid drop discharge unit moving mechanism 32 is capable of moving and stopping separately from the other mechanisms 32 in directions other than the uniaxial direction for the substrate reworking stage 34. The liquid drop discharge unit 6 can be thus positioned at any place on the substrate 9 by the uniaxial motion of the substrate reworking stage 34 and the motion of the liquid drop discharge unit moving mechanism 32.

The control section 33 issues an eject instruction to each liquid drop discharge unit 6, a move/stop instruction to each liquid drop discharge unit moving mechanism 32, and a move instruction to the substrate reworking stage 34. The section 33 is, for example, an ordinary computer in which computation programs are installed so that the computer can output instructions. On the basis of the defect information for the substrate 9 obtained by the determining section 10, the control section 33 performs control such that a liquid drop is dispensed to the dent (defective part).

The defect information acquisition unit 2, in the present embodiment, does not necessarily include the defect detector 21 and the laser-based defect removal device 22. The unit 2 only needs a function to acquire information on the defects substantially across the substrate 9. "Across the substrate" is meant to cover broad surface areas of the substrate, not local surface areas of it. The whole substrate surface may be divided into multiple wide areas to process the areas sequentially.

Figure 2:
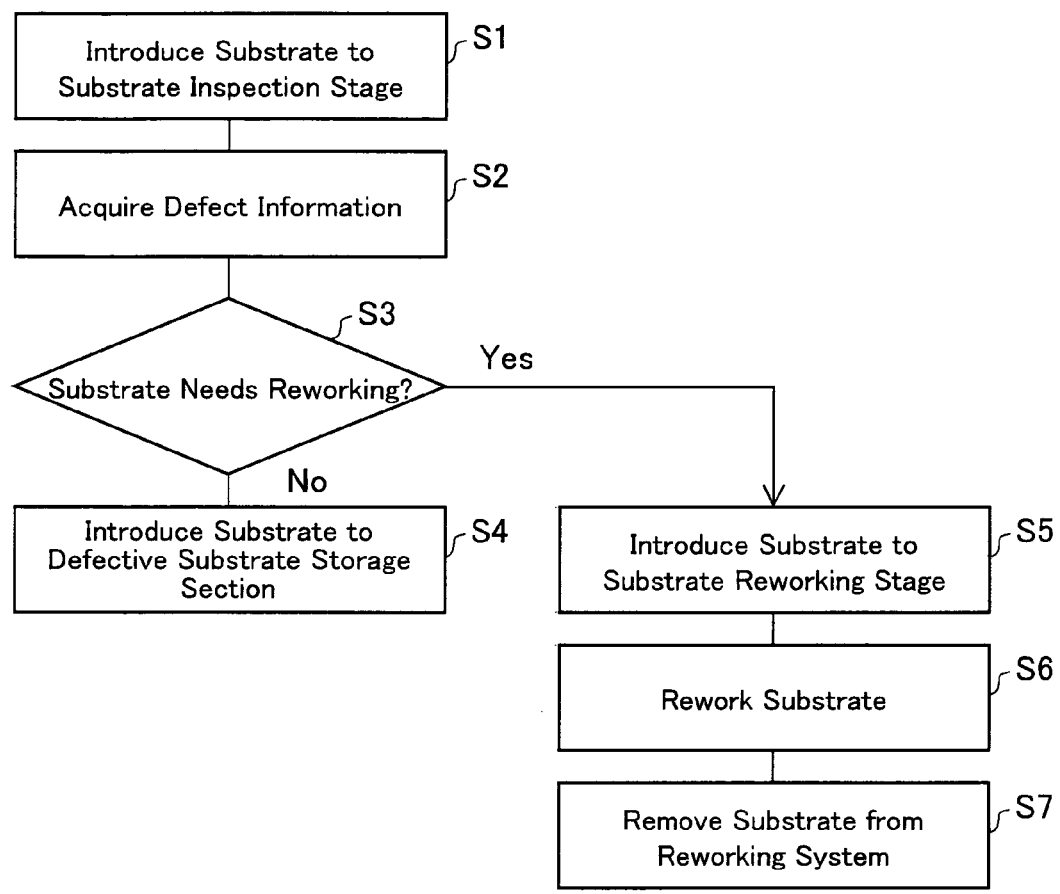
FIG. 2

FIG. 2 is a flow chart depicting an operation of the substrate reworking system 1. First, the substrate 9 is introduced to the substrate stage 24 (step S1). The defect detector 21 and the defect information acquisition device 23 then acquire information on the defects of the substrate 9 (step S2). Next, the determining section 10 determines if the defects of the substrate 9 needs reworking (step S3). If the determining section 10 determines that the defects of the substrate 9 needs reworking, the substrate 9 is introduced to the substrate reworking stage 34 (step S5). The liquid drop discharge units 6 then rework the defects of the substrate 9 sitting on the substrate reworking stage 34 (step S6). Next, the substrate 9 is removed from the substrate reworking system 1 (step S7). If the determining section 10 determines that the defects of the substrate 9 does not need reworking, the substrate 9 is introduced to the defective substrate storage section 52 (step S4).

The substrate whose defects have been determined not to need reworking may still be reused depending on the situation. For example, a substrate with defects which cannot be reworked properly for reuse (for example, a substrate with a high, local concentration of pixels which need reworking) does not need reworking. A substrate for which reworking will take time that does not match tact time also does not need reworking. The former is basically discarded, but may be temporarily stored and processed by other steps for use as a low-specification substrate where non-uniform color reproduction due to reworking does not pose a serious issue. The latter is likely to be reused after reworking by an off-line device operating separately from the preceding and succeeding steps although it is necessary to strike a good balance between the value of the reworked substrate and the reworking cost (the value of the reworked substrate and the time during which a dedicated use of the device is required).

Figure 3:
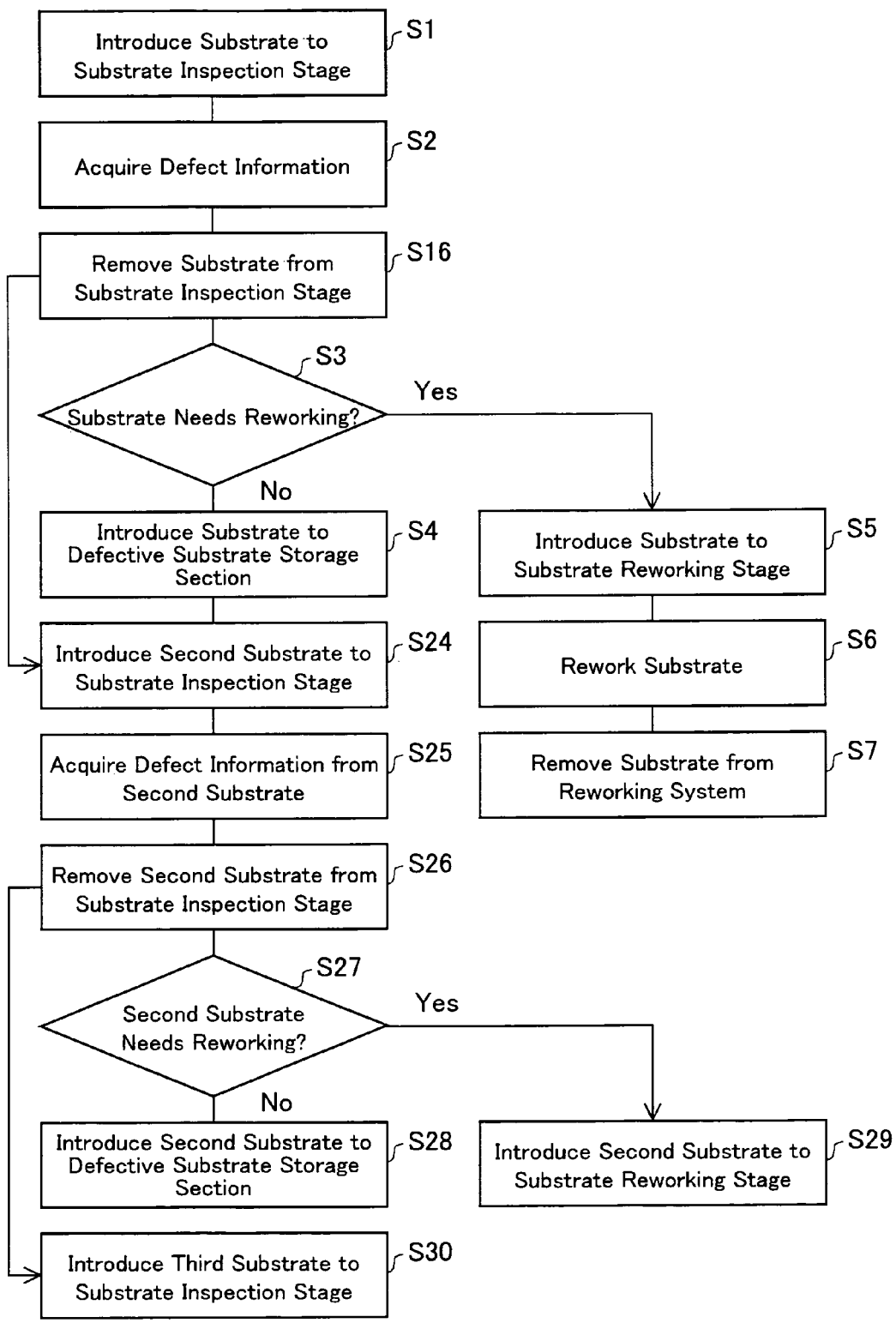
FIG. 3

FIG. 3 a flow chart depicting another operation of the substrate reworking system 1. The same members as those mentioned earlier in reference to FIG. 2 are indicated by the same reference numbers and description thereof will be omitted.

As indicated in the flow chart in FIG. 3, after the defect information acquisition unit 2 acquires the information on the defects, the substrate 9 having been processed is removed immediately from the substrate inspection stage 24, and a next substrate to be processed is introduced to the substrate inspection stage 24. The processed substrate that has been removed is handed over to either the reworking unit 3 or the defective substrate storage section 52 according to whether the substrate needs reworking. Thus, the system 1 is capable of efficiently determine the need for reworking and implement the reworking on multiple substrates.

First, the substrate 9 is introduced to the substrate stage 24 (step S1). The defect detector 21 and the defect information acquisition device 23 then acquire the information on the defects of the substrate 9 (step S2). Next, the substrate 9 is removed from the substrate stage 24 (step S16).

The determining section 10 determines if the defects of the substrate 9 needs reworking (step S3). If the determining section 10 determines that the defects of the substrate 9 needs reworking, the substrate 9 is introduced to the substrate reworking stage 34 (step S5). The liquid drop discharge units 6 then rework the defects of the substrate 9 sitting on the substrate reworking stage 34 (step S6). Next, the substrate 9 is removed from the substrate reworking system 1 (step S7). If the determining section 10 determines that the defects of the substrate 9 does not need reworking, the substrate 9 is introduced to the defective substrate storage section 52 (step S4).

After the substrate 9 is removed from the substrate stage 24, a next substrate 9 is introduced to the substrate stage 24 (step S24). The defect detector 21 and the defect information acquisition device 23 acquires information on the defects of the substrate 9 (step S25). The substrate 9 is then removed from the substrate stage 24 (step S26) before a further substrate 9 is introduced to the substrate stage 24 (step S30).

After the substrate 9 is removed from the substrate stage 24, the determining section 10 determines if the defects of the substrate 9 needs reworking (step S27). If the determining section 10 determines that the defects of the substrate 9 needs reworking, the substrate 9 is introduced to the substrate reworking stage 34 (step S29). If the determining section 10 determines that the defects of the substrate 9 does not need reworking, the substrate 9 is introduced to the defective substrate storage section 52 (step S28).

After being handed over temporarily to the defective substrate storage section 52, the target substrate 9 may be handed over again by the substrate transport unit 5 from the defective substrate storage section 52 to the reworking unit 3. The configuration adds to flexibility in the sequence of the processing steps for the substrate to achieve better efficient in the reworking of the substrate.

With the configuration described so far, the defect information acquisition unit 2 acquires the defect information for the target substrate 9. After that, on the basis of the defect information, the defective substrate can be transported selectively either to the defective substrate storage section 52 where the substrate is temporarily or permanently stored or to the reworking unit 3 where the substrate is reworked. Multiple substrates 9 are thus processed efficiently. In addition, the system 1 reduces tact time because it acquires defect information for a substrate 9 while reworking another substrate 9.

<Configuration of Defect Information Acquisition Unit 2>

The substrate inspection stage 24 in the defect information acquisition unit 2 includes a mechanism which fixes the substrate 9. The stage 24 is constructed of an XY stage and a rotary table provided on the XY stage. The XY stage is controllable through a linear encoder and has a linear guide mechanism acting as a guide axis. The use of the linear encoder enables output of the coordinates of the XY stage with 1 μm precision or better.

The defect detector 21, the laser-based defect removal device 22, and the defect information acquisition device 23 are fixed in the defect information acquisition unit 2. The defect detector 21, the laser-based defect removal device 22, and the defect information acquisition device 23 can be positioned over any part of the substrate 9 by moving the substrate inspection stage 24. The output of the coordinates of the stage 24 enables accurate output of the distance between two points on the substrate 9 as an example. The substrate 9 is mounted by a feeder robot (not shown) to the substrate inspection stage 24 so that the substrate 9 can be attached to the substrate inspection stage 24.

The defect detector 21 includes a CCD camera, an objective lens, an image processing section, and a memory. The CCD camera captures images in which the pixels on the substrate 9 observable. The image processing section determines if there are defective pixels in images captured by the CCD camera through binarization of the images. The memory stores information on the positions of the pixels determined to be defective by the image processing section.

The CCD camera observes the two alignment marks on the substrate 9. The orientation of the rotary table on the XY stage is controlled similarly to ordinary alignment of a substrate, and the positions of the defective pixels are sequentially stored as stage coordinate data. The coordinates of the alignment marks are also acquired.

The laser-based defect removal device 22 includes an ultraviolet laser (for example, YAG laser) and a laser shape adjuster. A laser radiation position is stored in advance in reference to the coordinates of the substrate inspection stage. The device 22 removes all the defective pixels on the substrate by the laser to form rectangular dents based on the information on the positions of the defective pixels obtained from the defect detector 21.

The defect information acquisition device 23 includes a CCD camera, an objective lens, and an image processing section. The CCD camera captures images in which the pixels on the substrate are observable. The image processing section determines if there are defective pixels in images captured by the CCD camera through binarization of the images. The device 23 accurately measures the positions of the rectangular dents detected by the image processing section. Here, information is acquired on the positions of all the dents on the substrate 9 in reference to the alignment marks on the substrate 9. In the case of the CF and EL substrates, information on the correction liquid to be ejected to the dent can be acquired from information on the color pixels adjacent to the dent (for example, if the adjacent pixels in a red/green/blue array are red and blue, the defective pixel is determined to be green).

Rough information can be collected on the positions of the defects in advance from results of the detection by the defect detector 21, whereby acquisition speed can be increased.

The defect information acquisition unit 2 needs nothing more than a function to acquire the coordinates of the defects in reference to the reference points on the substrate 9 wherein the defect detector 21 and the laser-based defect removal device 22 may be incorporated in another system and a hydrophilic processor (no example shown in the present system) may be provided after the laser-based defect removal step.

<Configuration of Reworking Means>

Figure 4:
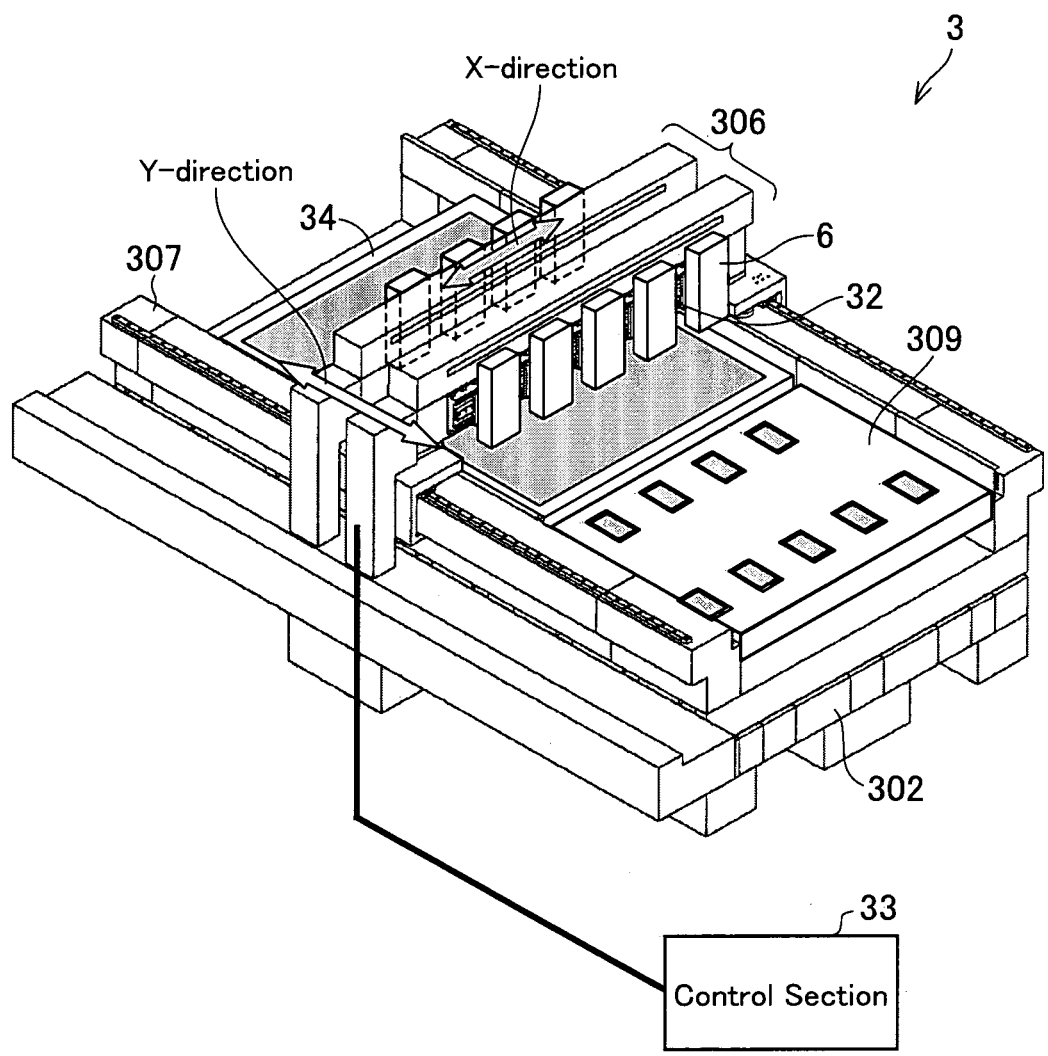
FIG. 4
Figure 5:
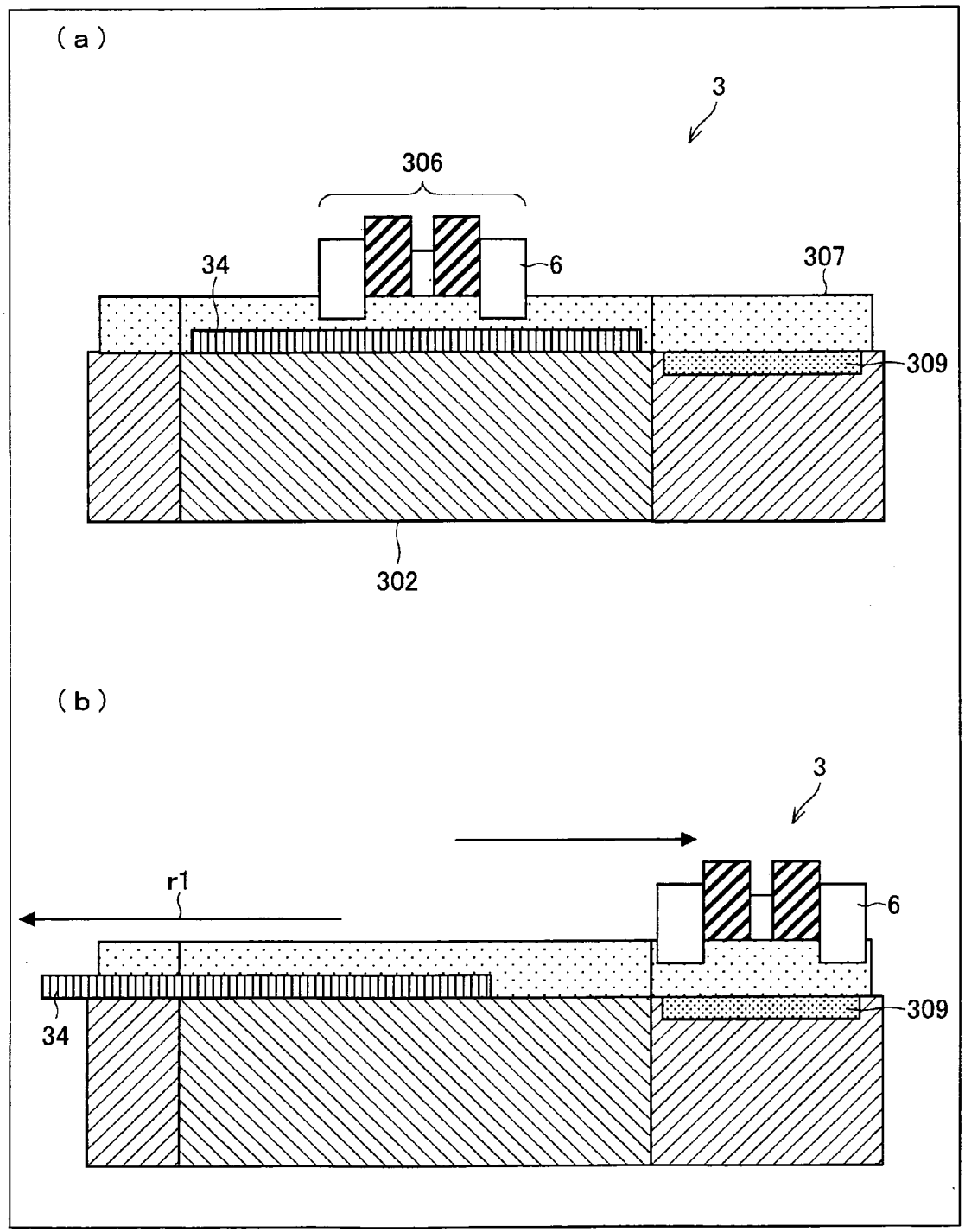
FIG. 5

Now, referring to FIGS. 4 to 7, the configuration of the reworking unit 3 will be described. FIG. 4 is an oblique view of the appearance of the reworking unit 3. (a) and (b) of FIG. 5 are schematic cross-sectional views of the reworking unit 3.

The reworking unit 3 includes a support body 302. The reworking unit 3 has a substrate reworking stage 34 and a printhead gantry unit 306. The substrate reworking stage 34 is provided on the support body 302 so that it can move when placing and removing the substrate. The printhead gantry unit 306 is disposed over the substrate reworking stage 34. The printhead gantry unit 306 can move back and forth only in the directions indicated by Y in FIG. 4 by virtue of the gantry slide mechanism 307 coupled to the support body 302.

The Multiple liquid drop discharge units 6 are provided on side faces of the printhead gantry unit 306. Each liquid drop discharge unit 6 is mounted to a liquid drop discharge unit moving mechanism 32 capable of moving the liquid drop discharge unit 6 in different directions (indicated by X in FIG. 4) from the directions (indicated by Y in FIG. 4) in which the printhead gantry unit 306 can move. The liquid drop discharge unit 6 mounted to the liquid drop discharge unit moving mechanism 32 can slide within a movable area on the liquid drop discharge unit moving mechanism 32 in different directions (indicated by X in FIG. 3) from the directions in which the printhead gantry unit 306 can move.

The multiple liquid drop discharge units 6 (nine of them in FIG. 4) are mounted on side faces of the printhead gantry unit 306 in combination with the respective liquid drop discharge unit moving mechanisms 32. The liquid drop discharge units 6 slide individually and independently in the X direction in FIG. 4 on the respective liquid drop discharge unit moving mechanisms 32 according to control instructions from the control section 33.

The liquid drop discharge unit 6 has a printhead ejection face on its bottom. The printhead ejection face is substantially parallel to the substrate reworking stage 34 and has a nozzle hole formed on it to eject liquid drops. The liquid drop discharge unit 6 dispenses liquid drops from the printhead ejection face to a target substrate placed on the substrate reworking stage 34 according to control instructions from the control section 33.

Apart from the substrate reworking stage 34, a maintenance mechanism 309 is provided on the device support body 302. The mechanism 309 includes a mechanism for capping the ejection face of the liquid drop discharge unit 6 when out of use, a mechanism for detecting a defective ejection port, and a mechanism for repairing the defective ejection port. For maintenance work, the gantry slide mechanism 307 moves the printhead gantry unit 306 to right above the maintenance mechanism 309 so that the mechanism 309 can carry out various maintenance operations on the liquid drop discharge units 6.

The substrate reworking stage 34 has formed on its top face multiple tiny holes (not shown). The holes are all coupled to an attachment/air blowing mechanism (not shown) so that the target substrate can be attached to and released from the substrate reworking stage 34 by attachment/air blowing control.

(a) and (b) of FIG. 5 are schematic cross-sectional views illustrating operation of the printhead gantry unit 306 and the substrate reworking stage 34 provided on the reworking unit 3. The substrate reworking stage 34 is controllably driven by a linear motor so that it can move on a slide rail (not shown) provided on the device support body 302. When the substrate is placed on the unit and removed from the unit, as shown in (b) of FIG. 5, the substrate reworking stage 34 moves in the direction indicated by Arrow r1 to the opposite end from the maintenance mechanism 309 across the device.

The substrate reworking stage 34 includes a θ rotation mechanism (not shown) therein so that the stage 34 is controllably driven by a linear motor so that it can move along a single direction on the slide rail and the substrate on the stage 34 can rotate freely in in-plane directions.

The substrate reworking stage 34 also includes a mechanism for moving microscopic distances at right angles to the slide rail. The top face of the substrate reworking stage 34 is made of a highly flat stone surface plate and parallel to the ejection faces of the liquid drop discharge units 6.

Figure 6:
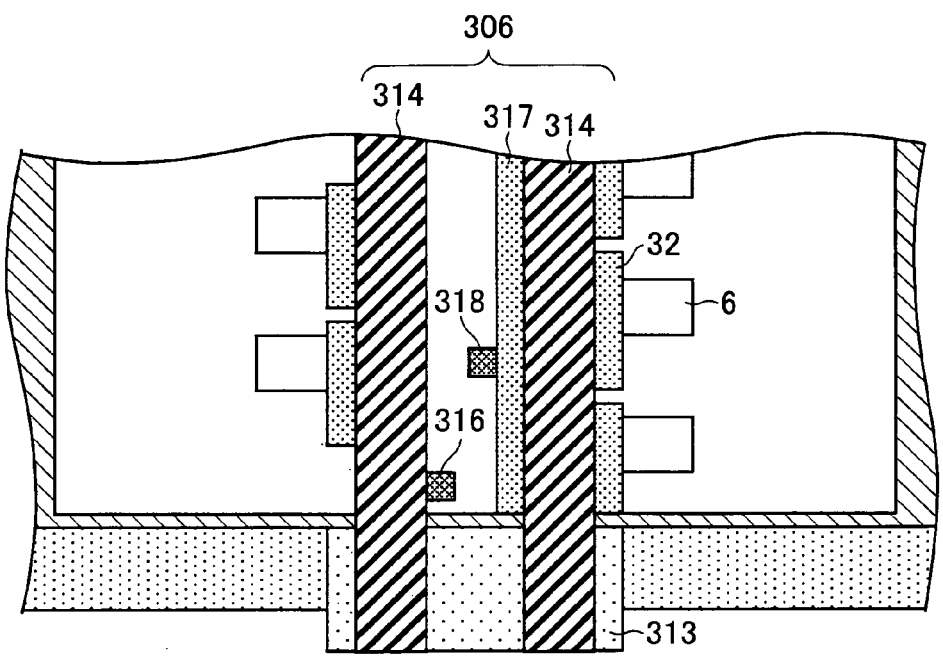
FIG. 6
Figure 6:
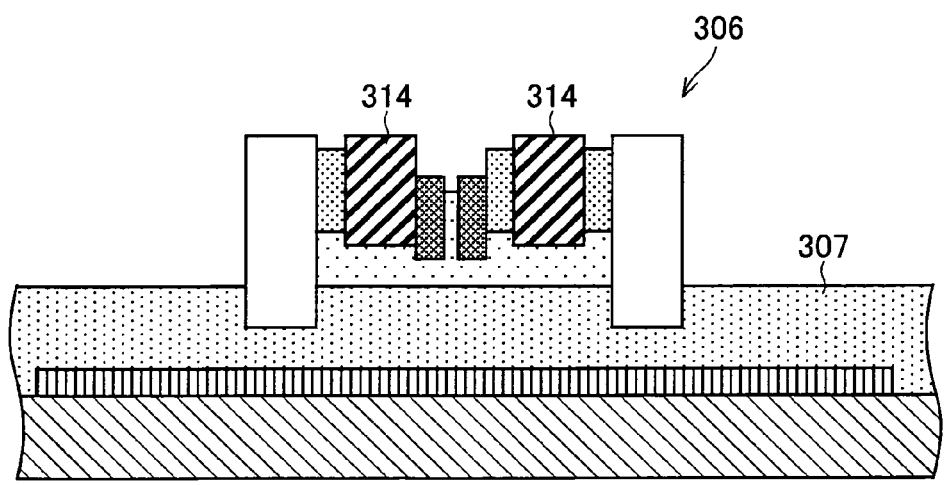

(a) of FIG. 6 is a plan view of major components of the printhead gantry unit 306 as viewed from the Z direction, and (b) of FIG. 6 is a front view of the major components as viewed from the X direction. The configuration of the printhead gantry unit 306 will be described in reference to (a) and (b) of FIG. 6.

The printhead gantry unit 306 includes a pair of gantries 314 coupled together by a float slide mechanism 313. Liquid drop discharge units 6 and liquid drop ejection means moving mechanisms 32 (four pairs of them in the example shown in FIG. 4) are provided on an outward side face of one of the gantries 314.

Two alignment cameras 316 for the in-plane rotation control of the substrate are fixed on that side face of the same gantry 314 which is opposite the outward side face and which is located between the two gantries 314. FIG. 6 shows only one of the cameras 316. The other, equivalent camera 316 is disposed in the space above (a) of FIG. 6.

Like the gantry 314 described above, the other gantry 314 has, on its outward side face, liquid drop discharge units 6 and liquid drop ejection means moving mechanisms 32 (5 pairs of them in the example shown in FIG. 4). An observation camera unit 318 is attached by a camera slide mechanism 317 in a moveable fashion to that side face of the same gantry 314 which is opposite the outward side face and which is located between the two gantries 314. The camera slide mechanism 317 allows motion of the observation camera unit 318 along the length of the gantries 314.

The gantry slide mechanism 307 causes the printhead gantry unit 306 to float by wind between the mechanism 307 and the float slide mechanism 313. The mechanism 307 can also move the printhead gantry unit 306 to any given position along the Y direction in FIG. 4 by linear drive control between the mechanism 307 and the float slide mechanism 313 according to control signals from the control section 33.

Figure 7:
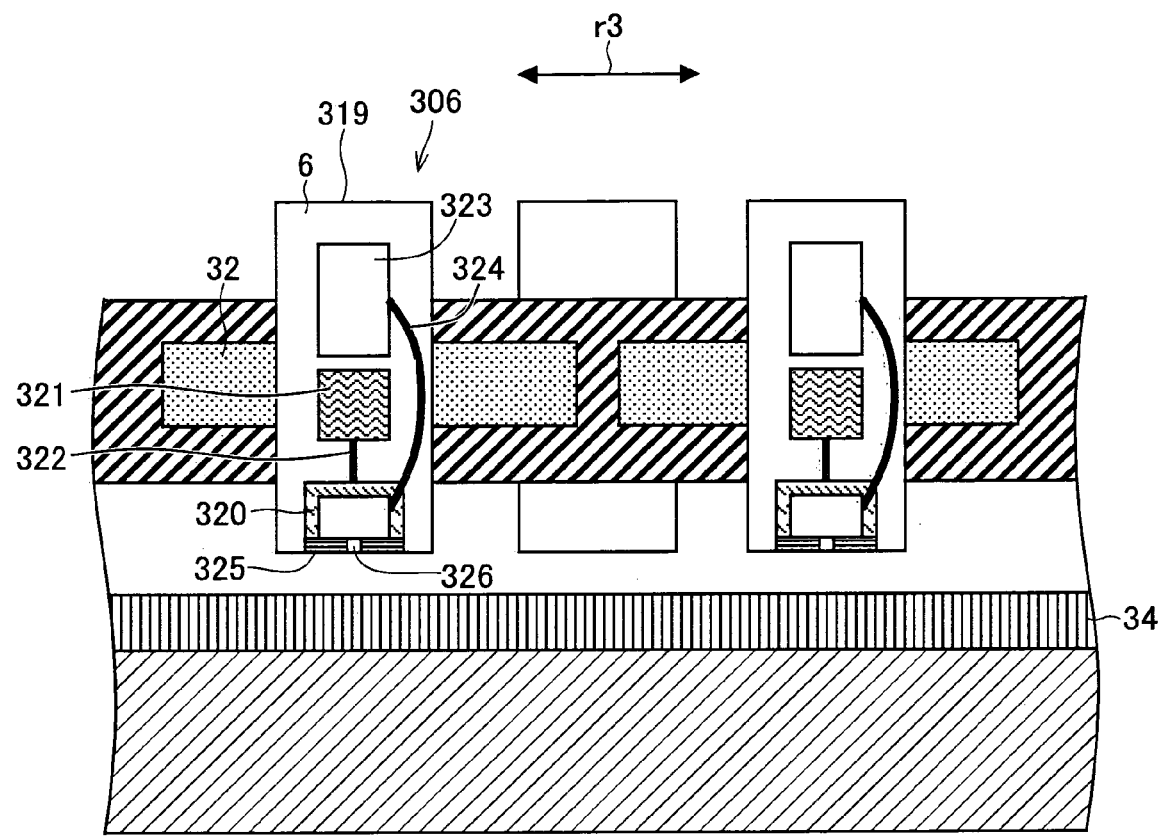
FIG. 7

FIG. 7 is a side view of major components of the liquid drop discharge unit 6 as viewed from the Y direction in FIG. 4. The liquid drop discharge units 6 are mounted to the liquid drop discharge unit moving mechanisms 32 on the printhead gantry unit 306 and capable of individually and independently moving in the directions indicated by Arrow r3.

The liquid drop discharge units 6 each include an ejection element 320, a drive control circuit 321, an electric connection cable 322, an ink container 323, an ink tube 324, and a housing 319 for these components. The housing 319 slides on the liquid drop discharge unit moving mechanism 32.

A nozzle plate 325 is pasted to a face of the ejection element 320 which is parallel to the top face of the substrate reworking stage 34. The nozzle plate 325 has multiple nozzle holes 326. The nozzle hole 326 is 10 to 25 μm in diameter.

The ejection element 320 employs a publicly known structure where grooves, which will act as ink chambers, are formed in a piezoelectric substrate and electrodes are formed on part of side faces of a separation wall so that an electric field applied across both side faces of the separation wall can cause shear deformation of the separation wall itself to produce ejection energy. The drive control circuit 321 is connected to a drive control system (not shown) via a cable (not shown) to achieve ejection control. The gap between the liquid drop ejection face (bottom face of the nozzle plate 325) and the top face of the target substrate is adjusted in advance to 0.5 to 1 mm when the target substrate 9 is placed on the substrate reworking stage 34.

Figure 8:
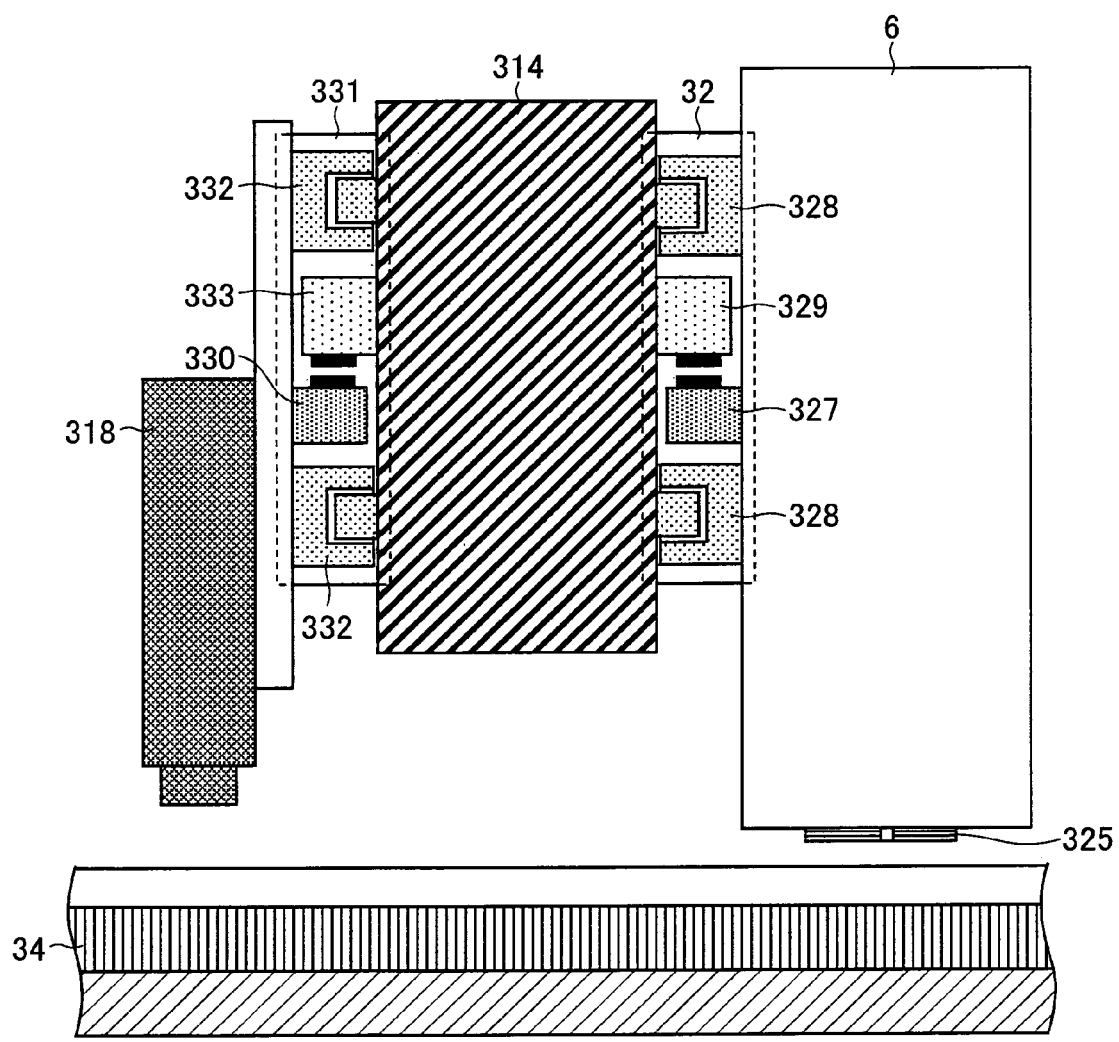
FIG. 8

FIG. 8 is a front view of major components of the liquid drop discharge unit moving mechanism 32 as viewed from the X direction in FIG. 4. Referring to FIG. 8, the configuration of the liquid drop ejection means moving mechanism 32 will be described.

The liquid drop discharge unit moving mechanism 32 includes two LM guides 328 (manufactured by THK Co., Ltd.) and a gantry linear scale 329 disposed between the two LM guides 328. The driving operation by a linear drive mechanism 327 attached to the liquid drop discharge unit 6 is controlled to slide the liquid drop discharge unit 6 to a predetermined position along the X direction in FIG. 4 (direction perpendicular to the page of FIG. 8). The linear scale 329 is made up of an array of small permanent magnets oriented alternately in terms of the north and south poles.

The linear drive mechanism 327 is capable of freely generating north and south poles when a.c. driven. The magnetic force between the linear scale 329 and the linear drive mechanism 327 enables the control of the position of the liquid drop discharge unit 6 on the liquid drop discharge unit moving mechanism 32. The LM guides 328 have an effective motion stroke of 250 mm. The linear scale 329 is located beyond this range of effective stroke. The slide motion of the liquid drop discharge unit 6 driven by the liquid drop discharge unit moving mechanism 32 is adjusted in advance so as to maintain a constant gap between the top face of the substrate reworking stage 34 and the nozzle plate 325 (liquid drop ejection face of the liquid drop discharge unit 6). The liquid drop discharge unit moving mechanisms 32 provided on a side face of the other gantry 314 have a similar structure; description is not repeated here.

The structure of a camera slide mechanism 331 will be described in reference to FIG. 8. The observation camera unit 318 can output address information of the target substrate relative to the alignment marks by virtue of a Y-direction information acquisition function of the gantry slide mechanism 307 and an X-direction information acquisition function of the camera slide mechanism 331. The observation camera unit 318 primarily observes images of liquid drops reaching the substrate from the liquid drop discharge unit 6 to output the ejection condition of the liquid drop discharge unit 6 or the addresses of the landing positions of the liquid drops in relation to the alignment marks.

The liquid drops can be made to land at desired positions on the target substrate by correcting ejection timings for the Y direction and correcting distances that the liquid drop discharge unit moving mechanism 32 moves for the X direction, using the landing position coordinates obtained by the observation camera unit 318 for the liquid drop discharge unit 6.

The camera slide mechanism 331, similarly to the liquid drop discharge unit moving mechanism 32, includes two LM guides 332 (manufactured by THK Co., Ltd.) and a linear scale 333 for the camera. The scale 333 is disposed between the two LM guides 332. The driving operation by a linear drive mechanism 330 attached to the observation camera unit 318 is controlled to move the observation camera unit 318 to a predetermined position along the X direction in FIG. 4 (direction perpendicular to the page of FIG. 8). The LM guides 332 have an effective motion stroke of 2500 mm. The linear scale 333 is located beyond this range of effective stroke.

Figure 9:
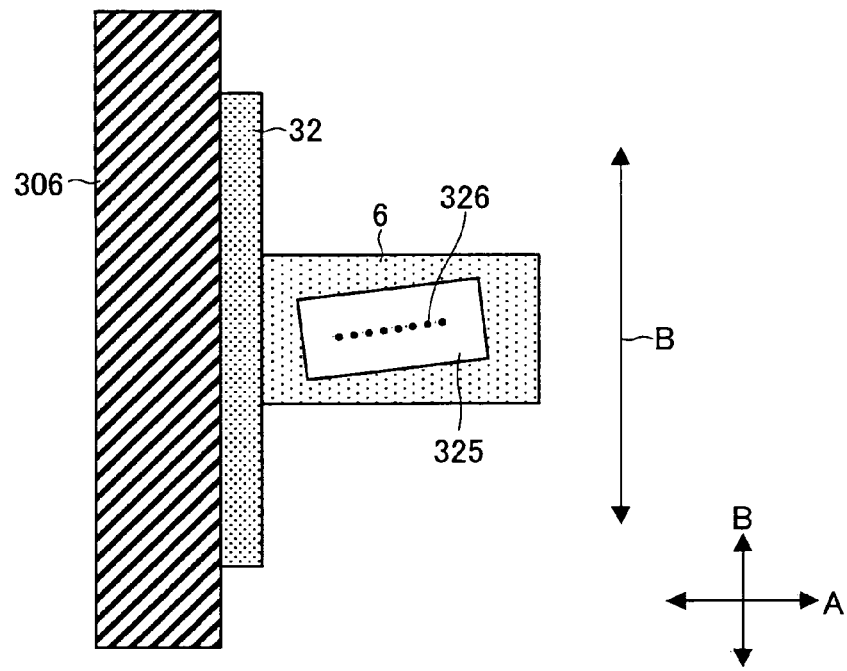
FIG. 9
Figure 9:
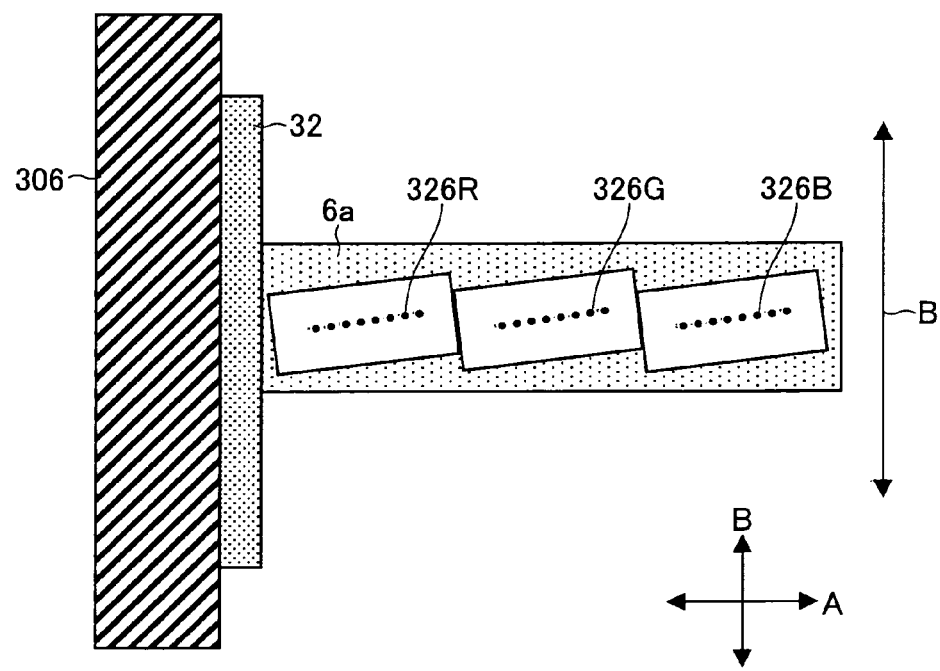

(a) of FIG. 9 is a bottom view of major components of the liquid drop discharge units 6, depicting its structure. (b) of FIG. 9 is a bottom view of major components, depicting a liquid drop discharge unit 6a having a different structure. Arrays of nozzle holes in the liquid drop discharge units will be described in reference to (a) and (b) of FIG. 9. (a) of FIG. 9 shows a device in which are there provided multiple liquid drop discharge units 6 all ejecting the same liquid. A liquid drop discharge unit 6 is attached to the printhead gantry unit 306 with a liquid drop discharge unit moving mechanism 32 intervening between them so that the unit 6 can move in the X direction indicated by an arrow (see FIG. 4). The nozzle holes 326 in the nozzle plate (liquid drop ejection face) 325 are disposed in a line that is at several degrees from the direction perpendicular to arrow B. All the nozzle holes 326 forming the line eject the same liquid drop material.

(b) of FIG. 9 shows a device in which are there provided multiple liquid drop discharge units 6a which have nozzle plates ejecting three liquids. The liquid drop discharge unit 6a has an array of nozzle holes 326R ejecting a first liquid drop material, an array of nozzle holes 326G ejecting a second liquid drop material, an array of nozzle holes 326B ejecting a third liquid drop material. The arrays are at several degrees from the direction perpendicular to direction B. The arrays are configured so that their projections in direction B match in practice. The arrays of nozzle holes may be moveable by short distances in direction B inside the liquid drop discharge unit 6a.

Referring to (a) and (b) of FIG. 10, an alignment operation will be described which takes place after the target substrate 9 is mounted on the substrate reworking stage 34 in the reworking unit 3. Two alignment marks 337 are provided near an end of the target substrate 9 attached and fixed to the substrate reworking stage 34 to correct the in-plane rotational direction of the target substrate 9.

Figure 10:
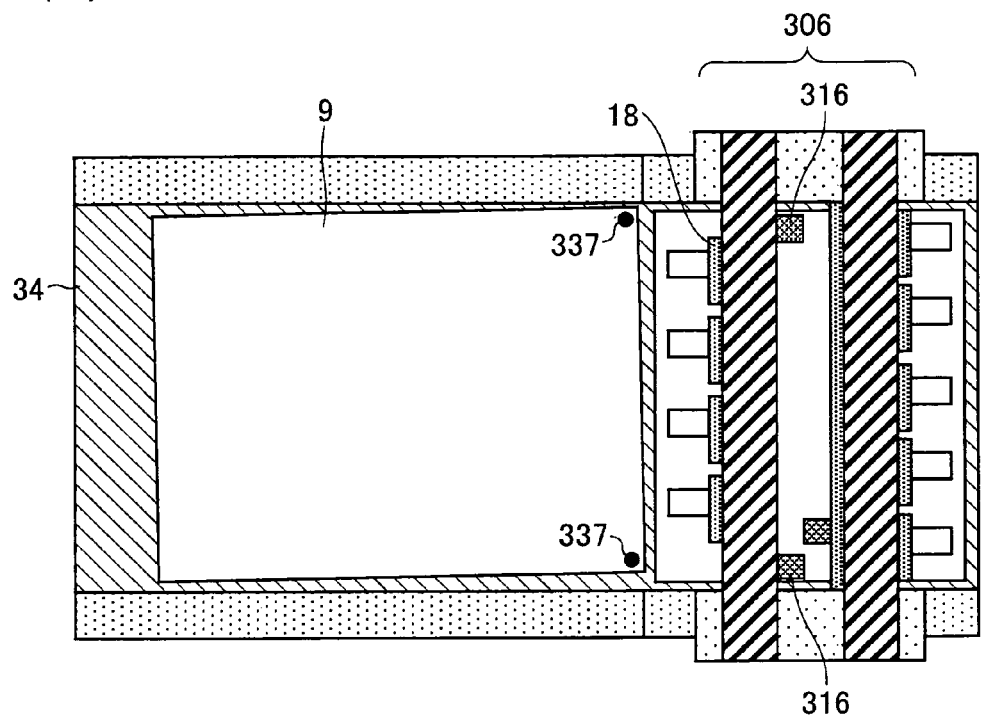
FIG. 10
Figure 10:
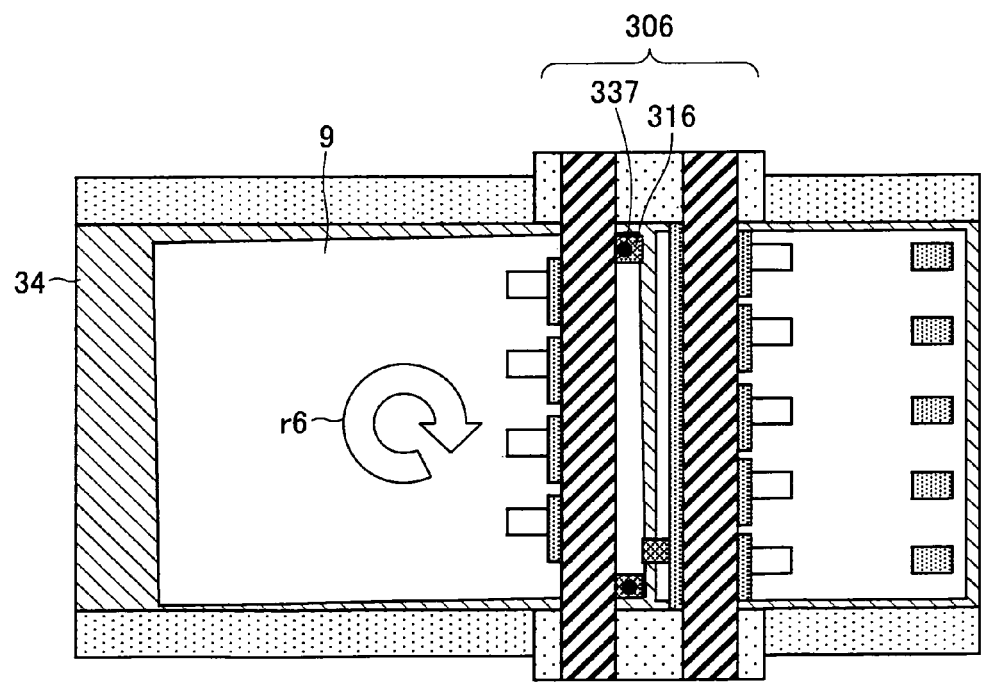

The two alignment camera 316 fixed to the printhead gantry unit 306 moves together with the printhead gantry unit 306 from the positions indicated in (a) of FIG. 10 to the positions indicated in (b) of FIG. 10. Dislocation of the target substrate 9 in the in-plane rotational direction is calculated from image information from the alignment cameras 316. The θ rotation mechanism and the mechanism for moving microscopic distances in the direction indicated by arrow r3, both provided in the aforementioned substrate reworking stage 34, correct the orientation of the substrate 9 in the direction indicated by rotational arrow r6 shown in (b) of FIG. 9.

The target substrate 9 has two high precision alignment marks 337 in advance. The positions of application of liquid drops on the target substrate 9 are predetermined with respect to the alignment marks 337. The alignment marks 337 are concentric circles. The two alignment marks 337 on the target substrate 9 has a pitch deviation not greater than 2 μm. The two alignment cameras 316 are disposed on the printhead gantry unit 306 at the same pitch as the pitch of the two alignment marks 337.

The defect information acquisition unit 2 has already obtained defect position coordinates with respect to the reference points on the substrate 9. The two alignment marks 337 correspond to the reference points on the substrate 9. By virtue of this alignment operation, the reworking unit 3 is able to dispense correction liquid dropwise to defect positions according to the defect information (position coordinates of multiple defects) acquired by the defect information acquisition unit 2.

<Description of Reworking by Reworking Unit>

Figure 11:
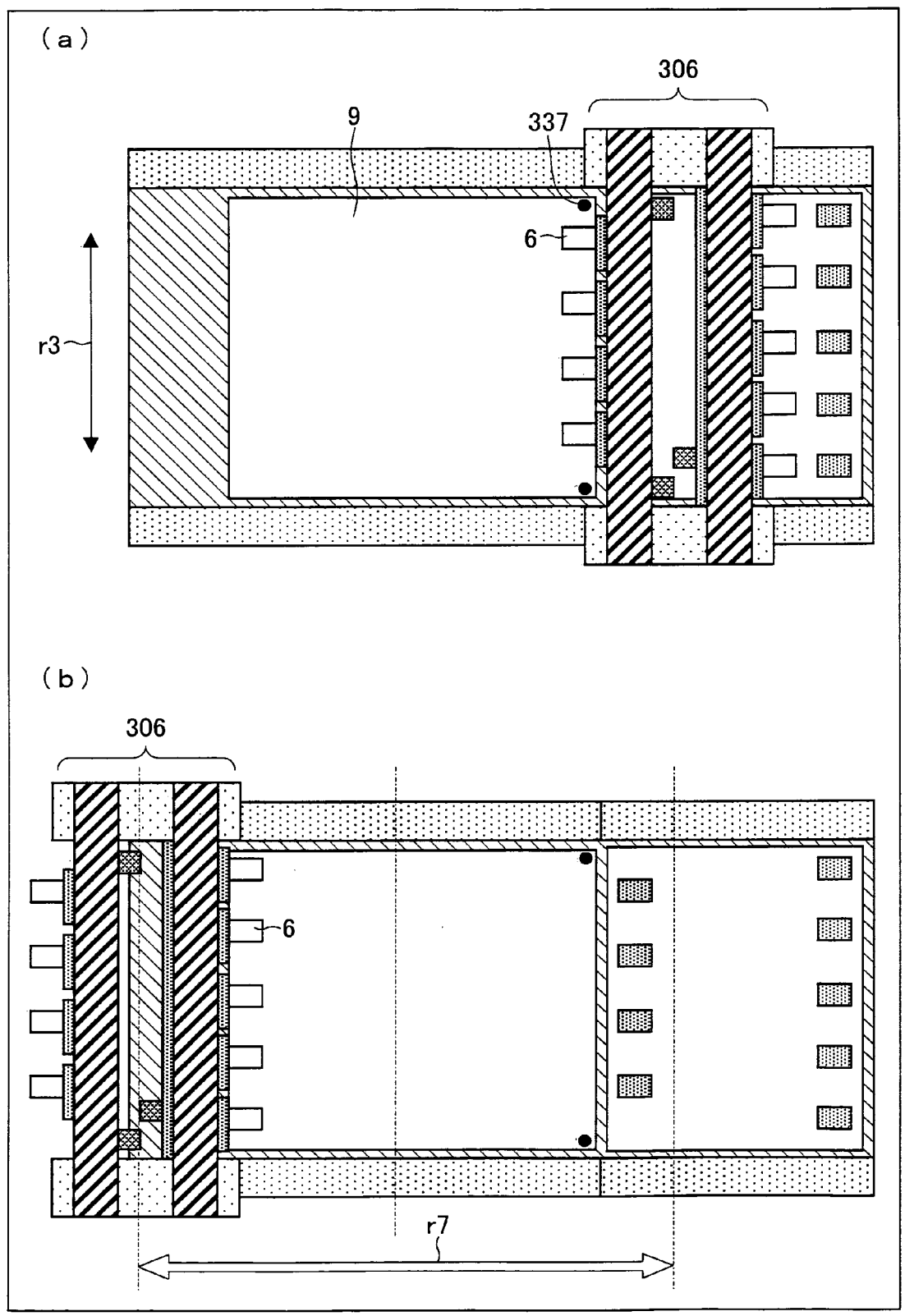
FIG. 11

(a) and (b) of FIG. 11 are plan views illustrating reciprocating motion of the printhead gantry unit 306. A method will be described whereby liquid drops are dispensed to desired positions on the target substrate 9 with respect to the alignment marks 337 after the orientation control is complete.

(a) of FIG. 11 shows the printhead gantry unit 306 having moved to the rightmost position in (a) of FIG. 11 in the operation of dispensing liquid drops to the target substrate 9. Meanwhile, (b) of FIG. 11 shows the unit 306 having moved to the leftmost position. The printhead gantry unit 306 reciprocates in the range indicated by arrow r7 once to several times. The liquid drop discharge units 6 on the printhead gantry unit 306 can move individually and independently in the direction indicated by arrow r3 in (a) of FIG. 11. The printhead gantry unit 306 itself reciprocates on the target substrate 9 to the left and right of the page (directions indicated by arrow r7). Each liquid drop discharge unit 6 moves in a direction indicated by arrow r3 and stops at a desired address before ejecting liquid drops. When the address of the desired position in the direction indicated by arrow r7 and in the direction indicated by arrow r3 matches while the printhead gantry unit 306 is reciprocating in the direction indicated by arrow r7, the liquid drop discharge unit 6 ejects a liquid drop. The liquid drop discharge units 6 are controlled individually and independently.

In (b) of FIG. 11, the printhead gantry unit 306 can move in the range indicated by arrow r7 which is beyond the width of the substrate measured perpendicular to the direction in which the liquid drop discharge units 6 move. The center line in the width of the substrate is approximately the center of the travel range of the printhead gantry unit 306.

By virtue of the capability of the liquid drop discharge unit 6 to move a greater distance than the width of the substrate in this manner, the liquid drop discharge unit 6 can dispense liquid drops onto desired positions (belt-like area) on the substrate within the motion stroke of the printhead gantry unit 306.

Figure 12:
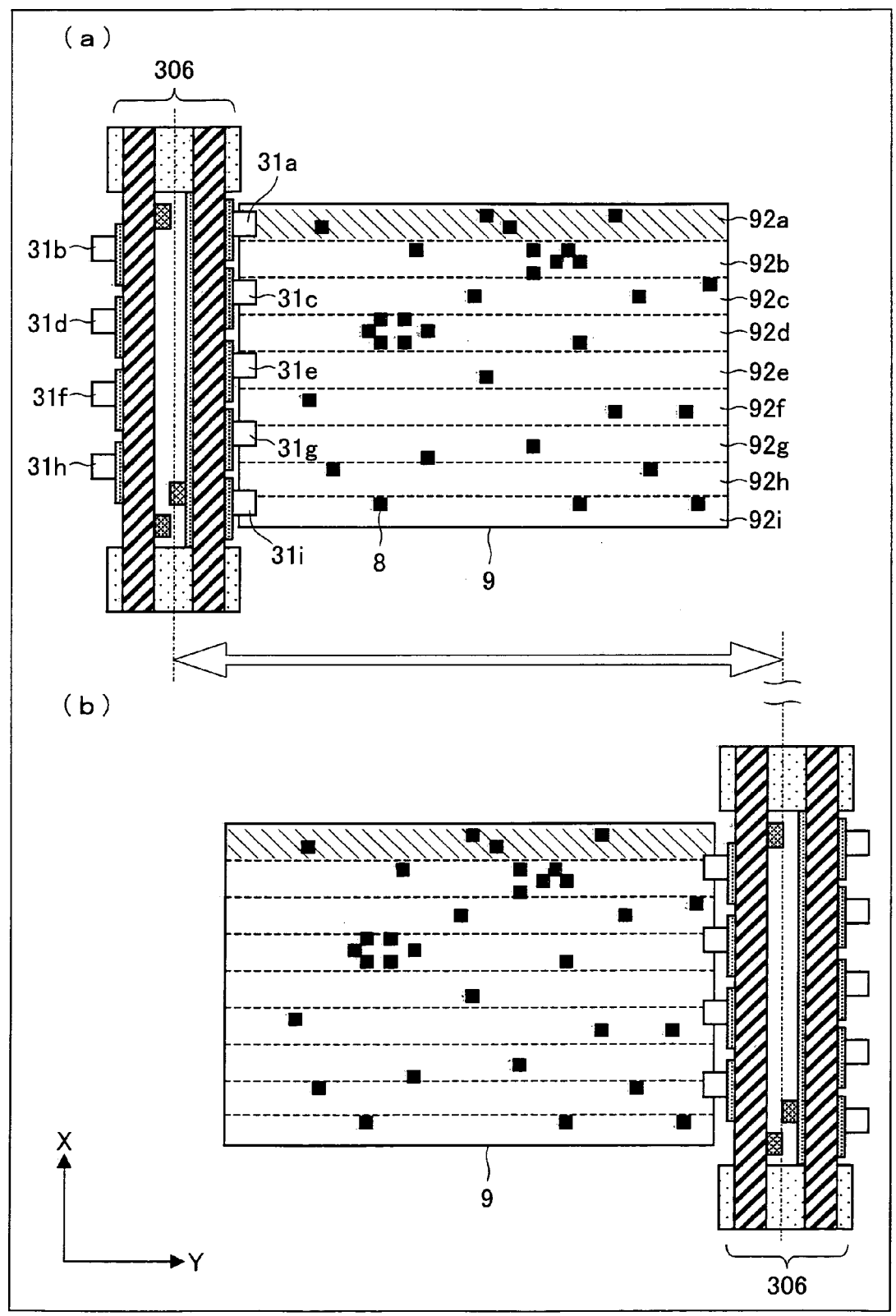
FIG. 12

(a) and (b) of FIG. 12 are plan views illustrating operation carried out by the printhead gantry unit 306 on the target substrate 9. The printhead gantry unit 306 has mounted to it nine liquid drop discharge units 31a, 31b, 31c, 31d, 31e, 31f, 31g, 31h, and 31i which are independently moveable in the X direction. Assignment areas 92a, 92b, 92c, 92d, 92e, 92f, 92g, 92h, and 92i are specified on the target substrate 9 for the respective liquid drop discharge units 31a to 31i.

The target substrate 9 (approximately 2.5 m×3 m) have about 30 to 300 ejection target sites (defects) 8. The liquid drop discharge units 31a to 31i are assigned belt-like assignment areas 92a to 92i which are elongate in the horizontal direction on the page. The liquid drop discharge unit 31a is assigned the area 92a. The liquid drop discharge units 31b is assigned the area 92b. The liquid drop discharge units 31a to 31i eject liquid drops to ejection target sites (defects) 8 on the assignment areas 92a to 92i.

As the printhead gantry unit 306 repeatedly reciprocates in the left/right direction on the page, the liquid drop discharge units 31a to 31i individually move in the X direction, stop where the address in the X direction matches, and stand by until the address in the Y direction matches during the motion of the printhead gantry unit 306, to move to exactly above the ejection target site 8 to which they are assigned. At the time when the desired position on the target substrate 9 come right below them, the liquid drop discharge unit is driven to eject a liquid drop from the ejection port to the desired position on the target substrate 9.

The nine liquid drop discharge units 31a to 31i are disposed at locations zigzagging between two lines as shown in (a) and (b) of FIG. 12. Owing to the arrangement, the target substrate 9 is divided into the nine areas 92a to 92i as indicated by the dashed lines in the figure so that the areas 92a to 92i can be assigned to the respective liquid drop discharge units 31a to 31i.

Figure 13:
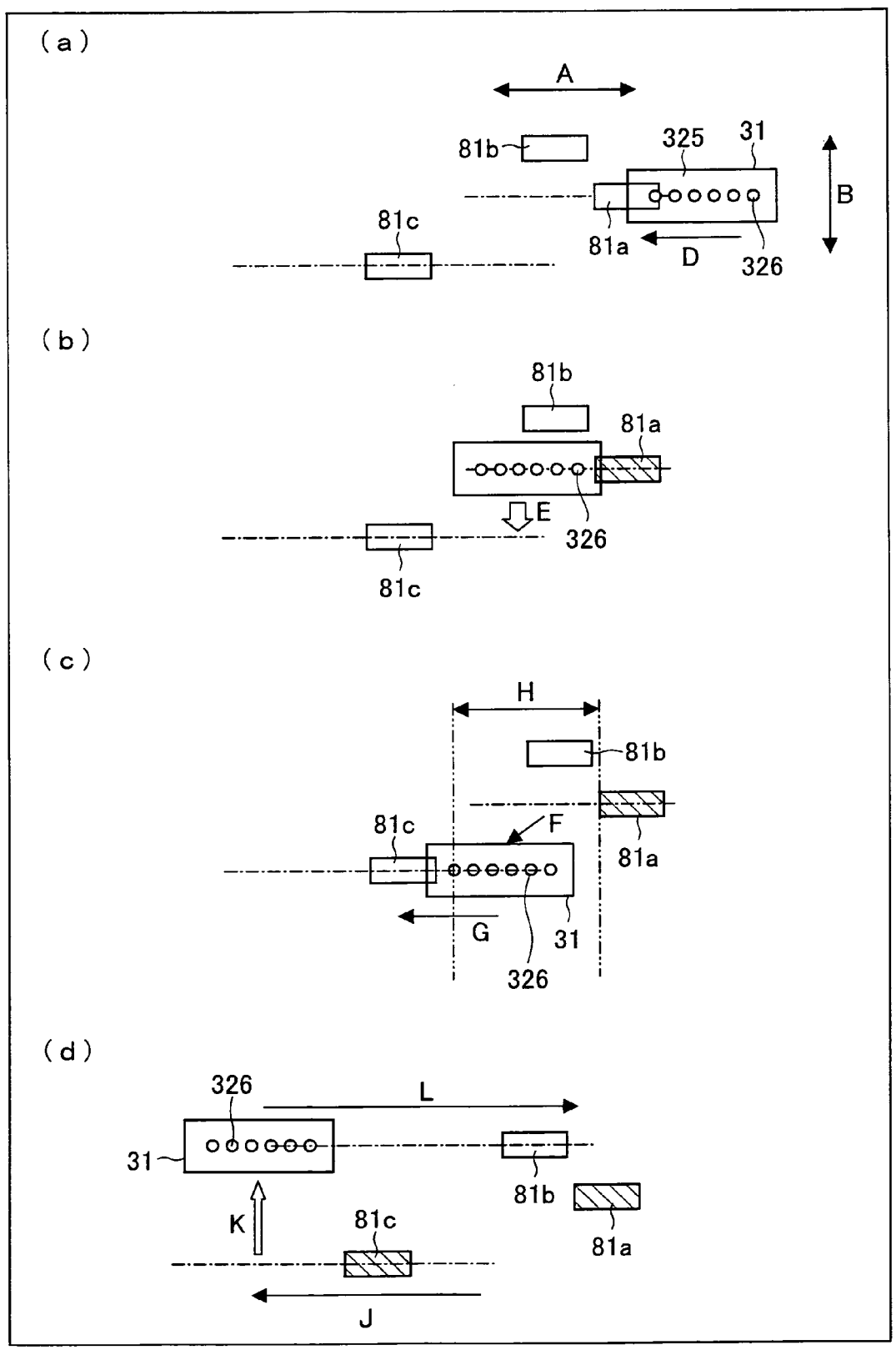
FIG. 13

(a) to (d) of FIG. 13 are schematic plan views, illustrating steps of ejection to deficient parts by the liquid drop discharge units 31. Steps will be described whereby the liquid drop discharge units 31 eject liquid drops to rectangular dents while the printhead gantry unit 306 is reciprocating. An example of such an operation is a case where deficient parts in a part of a color filter substrate are reworked using the reworking unit. The following will describe, as an example, a reworking unit when one of the colors of the pixels of a color filter substrate is deficient.

A "deficient part" here refers to a site contaminated with dust during manufacture or a site where a hollow indentation is formed that has been reshaped to a particular shape (dent) using, for example, a laser. The liquid drop discharge units 31 are assumed to eject the same liquid drop material. The description will explain a method of reworking a type of defective pixel (red, blue, or yellow). To rework deficient parts of all colors, a defect reworking device needs to be provided for each color material (i.e., three devices to cover three color materials) to enable sequential processing. Alternatively, a single liquid drop discharge unit should be capable of ejecting liquid drops of multiple colors.

Showing one of the liquid drop discharge units 31 on the printhead gantry unit 306, (a) to (d) of FIG. 13 illustrate the progress in time of ejection from the liquid drop ejection face of the one of the liquid drop discharge units 31 to multiple ejection target sites.

Referring to (a) of FIG. 13, deficient parts (defects) 81a, 81b, and 81c on the target substrate are dents with a depth of about 2 μm. Their openings are rectangles of about 200 μm×70 μm with the longer sides extending in the moving direction of the printhead gantry unit 306. In (a) to (d) of FIG. 13, the deficient parts (defects) 81a, 81b, and 81c are drawn so that the longer sides appear parallel to the moving direction A of the printhead gantry unit 306. However, the longer sides are actually at several degrees off the direction as shown in (a) and (b) of FIG. 9. The nozzle ejection face of the liquid drop discharge unit 31 is parallel to a face of the transport stage opposite the nozzle ejection face. A nozzle plate 325 has multiple nozzle holes 326 formed therein. The nozzle holes 326 are lined up in the left/right direction on the page in which the printhead gantry unit 306 moves. Each nozzle hole 326 has an ink pressurization chamber and pressurization control means (neither shown) behind the hole so that the ejection of liquid drops can be controlled. The nozzle holes 326 in the same line eject the same liquid drop material.

The printhead gantry unit 6 continuously reciprocates at substantially constant speed (300 mm/s to 500 mm/s) in the left/right direction on the page, irrespective of the motion of and ejection operation by the liquid drop discharge unit 31. To eject a liquid drop to the deficient part 81a for reworking, the liquid drop discharge unit moving mechanism 32 moves the liquid drop discharge unit 31 at high speed and stops the unit 31 so that the nozzle holes 326 come substantially above the center line of the deficient part 81a. A subsiding time, as well as the time in which the unit 31 is actually moving, should be counted in to calculate motion time for the liquid drop discharge unit 31. The "subsiding time" refers to the period starting when the unit 31 comes to a halt and the remaining vibration caused by the liquid drop discharge unit moving mechanism 32 subsides to a level where the ejection of liquid drops is not adversely affected.

Having moved in advance to the center line of the deficient part 81a in the direction in which the transport stage is moving, the liquid drop discharge unit 31 moves relatively in the direction indicated by arrow D due to constant speed motion of the transport stage and ejects liquid drops from the nozzle holes 326 above the deficient part 81a. More than one of the nozzle holes 326 come right above the deficient part 81a and can be used for this operation. The constant speed at which the transport stage is moving can be increased over the speed feasible in cases where a single nozzle hole is used. The overall substrate processing speed can be thus improved.

Next, the liquid drop discharge unit 31, having ejected liquid drops to the deficient part 81a, is driven by the liquid drop discharge unit moving mechanism 32 to move in the direction indicated by arrow E as shown in (b) of FIG. 13 to rework the deficient part 81c. The unit 31 then stops at a position where the center line of the deficient part 81c matches the nozzle holes 326. The printhead gantry unit 306 is simultaneously moving leftward on the page at constant speed; the liquid drop discharge unit 31 therefore moves relatively in the direction indicated by arrow F in (c) of FIG. 13 before coming to a halt. The liquid drop discharge unit 31 ejects liquid drops from the nozzle holes 326 located right above the deficient part 81c to rework the deficient part 81c while moving relatively in the direction indicated by arrow G due to the motion of the printhead gantry unit 306.

After completing the motion in one direction, the printhead gantry unit 306 starts moving in the opposite direction. The liquid drop discharge unit moving mechanism 32 moves the liquid drop discharge unit 31 in the direction indicated by arrow K to rework the deficient part 81b as shown in (d) of FIG. 13. The unit 31 then stops at a position where the center line of the deficient part 81b matches the nozzle holes 326. Owing to the motion of the printhead gantry unit 306, the liquid drop discharge unit 31 moves relatively in the direction indicated by arrow L and ejects liquid drops from some of the nozzle holes 326 that are located right above the deficient part 81b.

The three deficient parts 81a, 81b, and 81c are reworked sequentially in the order of 81a, 81b, and 81c as above by way of the reciprocating motion of the printhead gantry unit 306. As shown in (c) of FIG. 13, some of the nozzle holes 326 are used for the ejection to the deficient part 81a. The unit 31 cannot be moved until the one of the nozzle holes 326 actually used in the ejection which is located rightmost on the page leaves right above the deficient part 81a. The liquid drop discharge unit 31 cannot be moved up or down on the page to proceed to reworking of a next deficient part at least in a region corresponding to the distance between those of the actually used nozzle holes 326 which are located at the rightmost and leftmost positions.

This inhibition range H includes the region covered by the speed of the transport stage multiplied by the sum of the time it takes to move in the direction indicated by arrow E ((b) of FIG. 13) and the time it takes for the remaining vibration to subside after moving, as well as a region from the end of the deficient part immediately after being processed to a belt-like range corresponding to the distance between the actually used nozzle holes 326 which are located at the rightmost and leftmost positions.

As shown in (c) of FIG. 13, the deficient part 81b is located in the inhibition range H for the deficient part 81a. Therefore, the deficient part 81b is not processed immediately after the reworking of the deficient part 81a. The deficient part 81c, which is out of the inhibition range H, is reworked first. After the reworking of the deficient part 81c, as the printhead gantry unit 306 moves back, the deficient part 81b, which is not out of the inhibition range H, is reworked.

The description heretofore has been focusing on the operation by the single liquid drop discharge unit 31. The reworking unit 3 however includes multiple liquid drop discharge units 6 which are independently operable. The reworking unit in accordance with the present embodiment, that is, the defect reworking device, is not limited to the defect reworking device for color filter substrates and is capable of ejecting liquid drops at desired sites across the substrate.

It would be clearly appreciated from the description above that even if the liquid drop discharge units 6 are assigned equal numbers of defects, the printhead gantry 306 may have to reciprocate more or fewer times for the reworking depending on the positions of the defects (the tact time for the reworking may be directly affected). Specifically, fewer defects can be reworked in a single scan and the reworking takes more time to complete if the defects are concentrated.

In, for example, CF and EL substrates, the presence of a concentration of defects not only prolongs the tact time required for the reworking, but can also be a cause for lack of color uniformity (below useable level) even after the defects are reworked.

<Configuration of Rework Determining Unit 4>

The rework determining unit 4 will be described in terms of its configuration. In the present embodiment, the rework determining unit 4 is a general-purpose computer and includes a CPU (central processing unit), a magnetic storage device, such as a HDD (hard disk drive), and a storage device (non-volatile memory). The general-purpose computer contains multiple control computation programs which are selectively executed according to required processes to produce outputs.

The defect information, associated with the individual substrate, which is output from the defect information reading device 23, is stored in the defect information storage section 41 in the rework determining unit 4, for example, a storage device in a general-purpose computer. The "defect information" refers, for example, to the identification number of the substrate, the total count of the defects of the substrate, the position coordinates of all the defects with respect to the alignment marks, and the information on the color of the defective parts.

If the reworking unit 3 includes a plurality of liquid drop discharge units 6, the assigning section 7 distributes the defect information retrieved from the defect information storage section 41 among the liquid drop discharge units 6. The assigning section 7 is, for example, a control computation program contained in the general-purpose computer. The program determines the defects to be assigned to each liquid drop discharge unit 6 based on the whole defect information for the substrate 9 and the prerecorded movable area data for the liquid drop discharge units 6.

Figure 14:
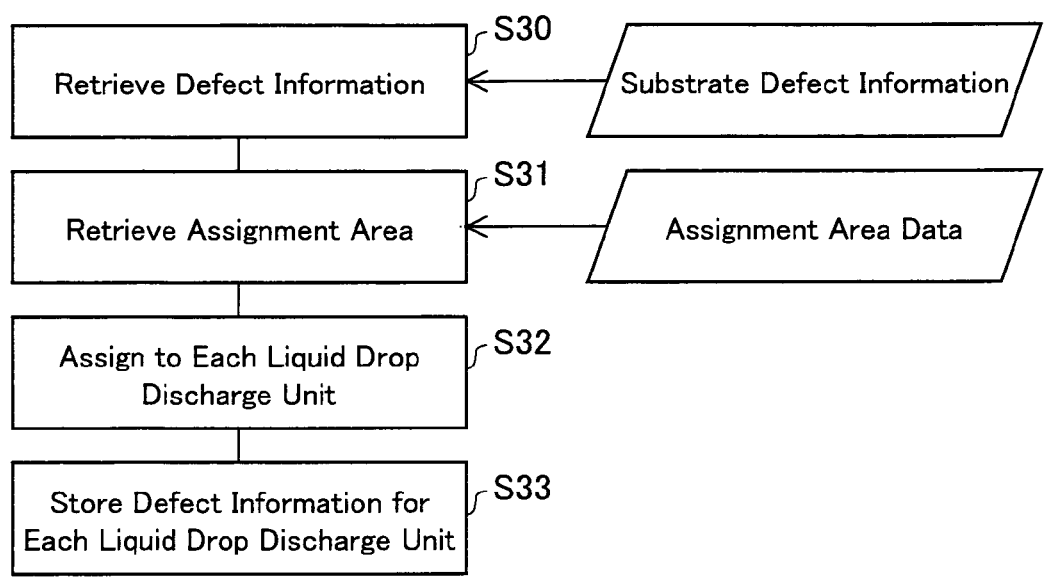
FIG. 14

FIG. 14 is a flow chart depicting the distributing of the defect information by the assigning section 7. The assigning section 7 retrieves the defect information for the substrate 9 from the defect information storage section 41 (step S30) and retrieves the predetermined assignment area data (step S31). The section 7 then compares the information with the data to assign defects to each of the liquid drop discharge unit 6 (step S32). The section 7 then stores the results as the defect information for the individual liquid drop discharge units (step S33).

Figure 15:
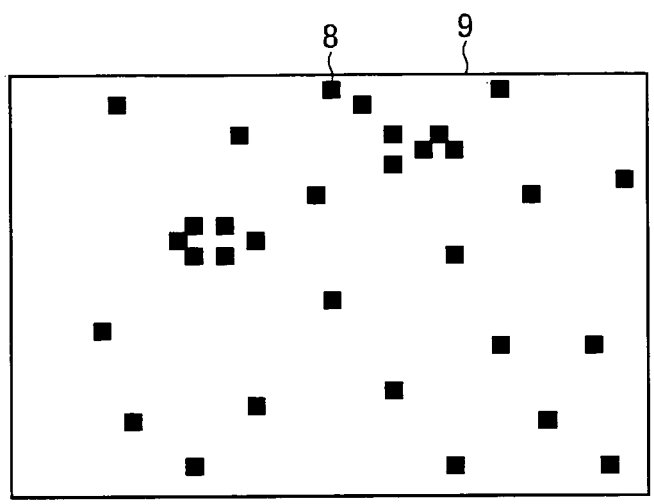
FIG. 15
Figure 15:
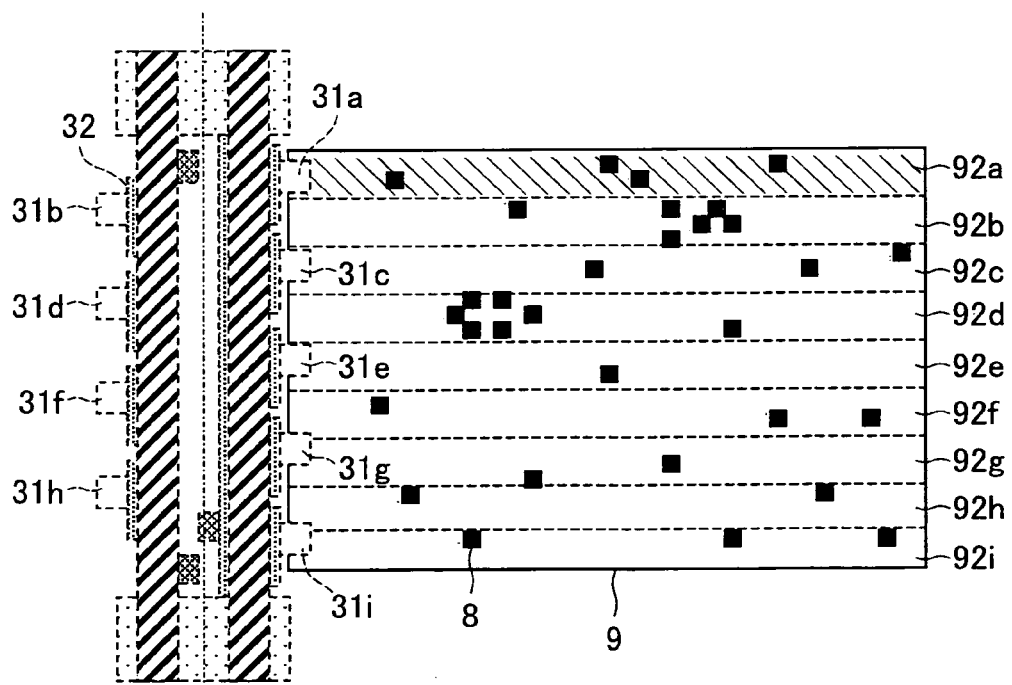

(a) and (b) of FIG. 15 are illustrations of how the assigning section 7 assigns defects 8 of the substrate 9. According to (a) of FIG. 15, the substrate 9 has defects 8, and the defect information reading device 23 has already acquired the defect information for the substrate 9. As shown in (b) of FIG. 15, the reworking unit 3 includes nine liquid drop discharge units 31a, 31b, 31c, 31d, 31e, 31f, 31g, 31h, and 31i and specifies the assignment area 92a, 92b, 92c, 92d, 92e, 92f, 92g, 92h, and 92i on the target substrate 9 correspondingly to the liquid drop discharge units 31a to 31i with the movable areas of the individual liquid drop discharge unit moving mechanisms 32 being taken into consideration. The assignment area can be specified in the form of a coordinates range with respect to the substrate alignment marks. The assigning section 7 determines which of the liquid drop discharge unit 31a to 31i should be assigned which defects on the basis of the defect information (the coordinates of all the defects with respect to the alignment marks of the substrate) and hands over results (substrate assignment information) to the determining section 10.

The nine liquid drop discharge unit moving mechanisms 32 are arranged so that their travel areas partially overlap. The adjacent assignment areas may therefore be arranged to overlap on the substrate so that the defects in the overlapping areas can be reassigned depending on the number of the defects assigned to the two liquid drop discharge units in the overlapping areas. The arrangement speeds up the reworking process.

The determining section 10 determines for each substrate 9 if the substrate needs reworking, from the defect information for the substrate 9 obtained from the defect information storage section 41 and the defect assignment information for each liquid drop discharge unit obtained from the assigning section 7. The determining section 10 is, for example, a control computation program contained in the general-purpose computer. According to the determination examples (detailed below), the program processes the defect information and the defect assignment information to determine if each substrate 9 needs reworking. Results are given to the substrate transport unit 5 or the substrate reworking unit 3.

The rework determining unit 4 is not necessarily a general-purpose computer and may be a control circuit board. The use of a dedicated control circuit in place of the control computation program speeds up the process.

<Determination Examples by Rework Determining Unit 4>

The following will describe example in which the determining section 10 in the rework determining unit 4 determines if a substrate needs reworking. The description merely gives examples; the methods may be used in any combination and are not exclusive in terms of the scope of the present invention.

DETERMINATION EXAMPLE 1

Necessity for Reworking Determined from Defect Count on Substrate

The determining section 10 calculates a total defect count N to be determined for the substrate 9 which is part of the defect information in the defect information storage section 41. If the total defect count N is greater than a predetermined threshold F, the section 10 determines that the substrate needs no reworking. This determination algorithm enables very quick computation. The need for reworking of the substrate or lack of it can be determined simply, conveniently, and efficiently.

The threshold F varies with product specifications and device specifications (limiting tact time). The threshold F for the total defect count is, for example, 300 or less for a 2.5×2 m substrate.

DETERMINATION EXAMPLE 2

Necessity for Reworking Determined from Assigned Defect Counts for Liquid Drop Discharge Units The determining section 10 calculates assigned defect counts N1 to N9 for the liquid drop discharge units 6 from the defect information contained in the defect information storage section 41 and the defect assignment information for each liquid drop discharge unit 6 obtained from the assigning section 7. If Nmax (maximum of N1 to N9) exceeds a predetermined threshold F1, the section 10 determines that the substrate needs no reworking.

When a plurality of liquid drop discharge units 6 collectively reworks the defects on the substrate 9 such that each unit works on the defects assigned to it, the tact time for the reworking of the entire substrate 9 often depends on the liquid drop discharge units 6 to which many defects are assigned. This determination algorithm enables simple, convenient, and very quick computation without need for complex determination procedures even if the reworking is done using a reworking unit 3 containing a plurality of liquid drop discharge units 6. The need for reworking of the substrate or lack of it can be determined efficiently.

The threshold F1 varies with product specifications and device specifications (limiting tact time). The threshold F1 for the assigned defect count for each liquid drop discharge unit 6 is, for example, 60 or less for a 2.5×2 m substrate if the defects are assigned to nine liquid drop discharge units 6.

DETERMINATION EXAMPLE 3

Necessity for Reworking Determined from Difference in Assigned Defect Count for Liquid Drop Discharge Units The determining section 10 calculates assigned defect counts N1, N2, and N9 for the liquid drop discharge units 6 and further calculates Nmax (maximum of N1 to N9) and Nmin (minimum of N1, N2, and N9) from the defect information contained in the defect information storage section 41 and the defect assignment information for each liquid drop discharge unit 6 obtained from the assigning section 7. If Ndif (=Nmax−Nmin) exceeds a threshold F2, the section 10 determines that the substrate needs no reworking.

The threshold F2 varies with product specifications and device specifications (limiting tact time). The threshold F2 for the 40 or less for a 2.5×2 m substrate if the defects are assigned to nine liquid drop discharge units 6. Alternatively, if the maximum assigned defect count is greater than twice the second maximum assigned defect count, the section 10 determines that the substrate needs no reworking.

When the reworking is done using a reworking unit 3 containing a plurality of liquid drop discharge units 6, if the liquid drop discharge unit B with a smaller assigned defect count completes the reworking and stands by while the liquid drop discharge unit A with a larger assigned defect count is still reworking, an extended standby time may be required. If the liquid drop discharge unit B stands by in non-ejection state for an extended period of time, the viscosity of the correction liquid rises near the nozzle holes. The increased viscosity could be a cause for inconveniences. The unit B may not be able to eject correction liquid in next substrate reworking. If the unit B can eject correction liquid, the liquid may not land at a desired position. In either case, the unit B is not able to dispense correction liquid dropwise to desired defective pixels.

This determination algorithm is able to determine in advance not to rework the substrate 9 which could lead to improper ejection by the liquid drop discharge unit 6 even when the reworking is to be done using a reworking unit 3 containing a plurality of liquid drop discharge units 6. The algorithm enables simple, convenient, and very quick computation without need for complex determination procedures and provides stability to the reworking by the reworking unit 3.

DETERMINATION EXAMPLE 4

Necessity for Reworking Determined from Maximum Defect Concentration on Substrate The determining section 10 calculates a maximum defect concentration M, or an indicator for evaluation of defect concentration, from the defect information contained in the defect information storage section 41. If the maximum defect concentration M exceeds a predetermined threshold F3, the section 10 determines that the substrate needs not reworking.

The maximum defect concentration M is calculated, for example, as follows. For a substrate with a total defect count N, the distance $K1=\sqrt{[\{(Xp-Xq1)^2+(Yp-Yq1)^2\}]}$ between a P-th defect P ($1 \leq P \leq N$) and its nearest defect Q1 is calculated from the coordinates, (Xp, Yp), of the defect P and the coordinates, (Xq1, Yq1), of the defect Q1. Likewise, the distance K2 between the defect P and the second nearest defect Q2, the distance K3 between the defect P and the third nearest defect Q3, the distance K4 between the defect P and the fourth nearest defect Q4, and the distance K5 between the defect P and the fifth nearest defect Q5 are calculated. The concentration Gp for the defect P is then calculated from Gp=K1+K2+K3+K4+K5.

These calculations are performed for all the first to N-th defects to obtain a maximum Gp ($1 \leq p \leq N$) as Gmax. The maximum defect concentration M is obtained from M=1/Gmax.

In the example, the sum of the distances from a defect to its five nearest defects is calculated for each defect to designate the reciprocal of the maximum one of the sums as the maximum defect concentration. The present invention is by no means limited to this definition. The maximum defect concentration may be defined in any manner provided that the definition gives an indicator for evaluation of the concentration of defects.

This determination algorithm identifies, prior to reworking, substrates having a high concentration of defects to determine that the substrate needs no reworking. Such substrates are undesirable because the reworking unit 3 can rework only a limited number of defects in a single scan, taking an extended period of time to complete the reworking and also because the concentration of reworked sites will likely cause lack of color uniformity such that the substrate remains of substandard quality even after reworking.

DETERMINATION EXAMPLE 5

Necessity for Reworking Determined from Rework Time Estimated by Rework Algorithm The determining section 10 calculates an estimated process time required to rework the assigned defects for each liquid drop discharge unit 6 from the defect information contained in the defect information storage section 41 and the defect assignment information for the liquid drop discharge unit 6 obtained from the assigning section 7. From these results, the section 10 then calculates an estimated process time for the entire reworking unit 3. If the latter estimation is greater than or equal to a predetermined threshold time value, the section 10 determines that the substrate needs no reworking.

The threshold time value varies with device specifications (durations of preceding and succeeding steps, comparison with operational cost of the device, etc.). As an example, the threshold time value is approximately 90 seconds for the reworking of a 2.5×2 m substrate (approximately 120 seconds including time taken to introduce and align the substrate).

The determining section 10 uses the same traversal algorithm as the control section 33 uses in reworking the reworking unit 3 to estimate a traversal path for the defects assigned for each liquid drop discharge unit 6 prior to actual reworking to estimate a necessary scan count for the liquid drop discharge unit 6.

Figure 16:
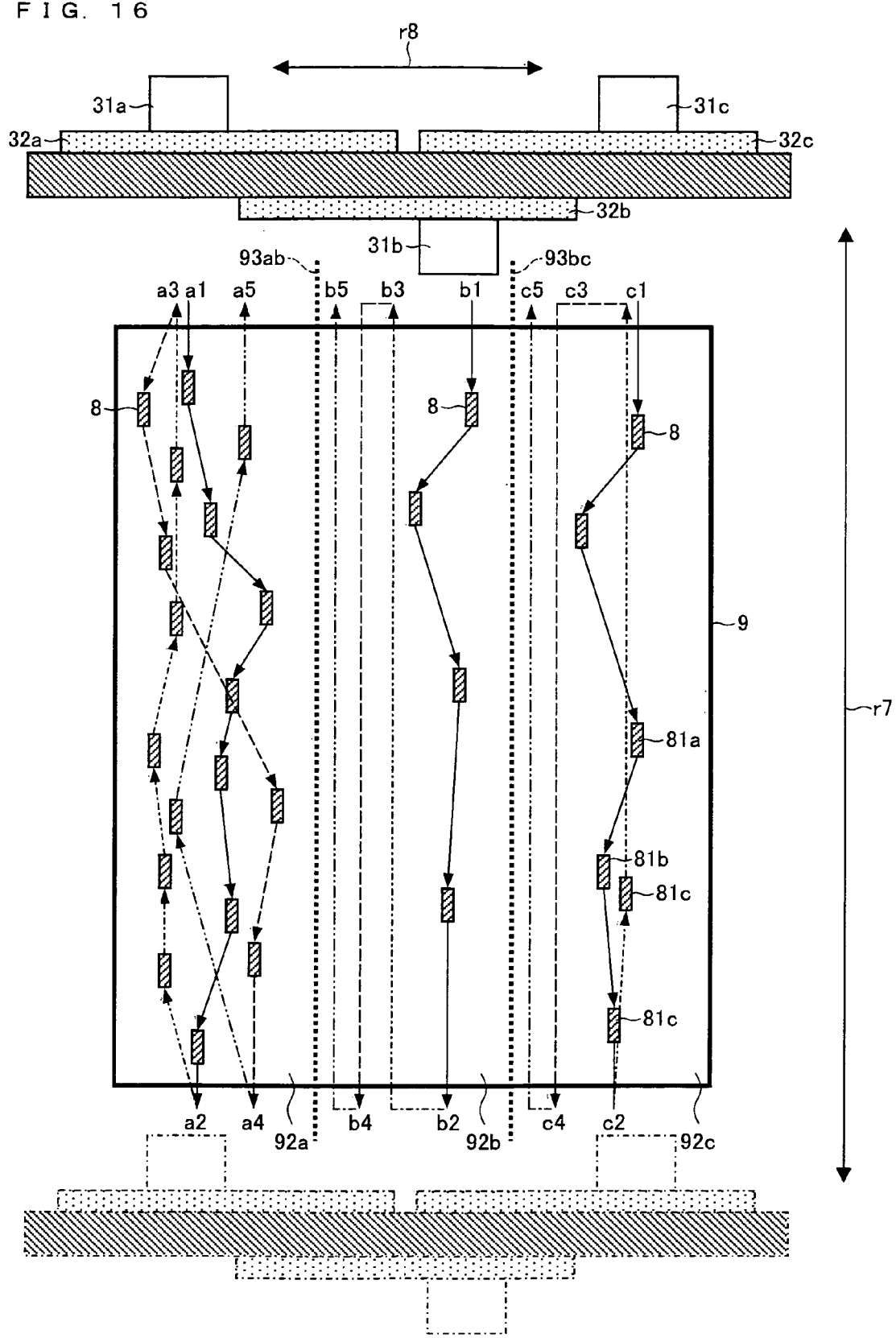
FIG. 16

FIG. 16 schematic illustrates the determination of a traversal path and a necessary scan count for the rework determining unit 4 and is a plan view of a substrate for which it is determined whether the substrate needs reworking. For convenience in description, the printhead gantry 306 is provided with three liquid drop discharge units 31a, 31b, and 31c in FIG. 16. The substrate 9 is divided into assignment areas 92a, 92b, and 93c. The liquid drop discharge unit moving mechanism 32 is driven to move the liquid drop discharge units 31a, 31b, and 31c to desired positions in the direction indicated by arrow r8 for reworking, while the printhead gantry 306 is reciprocating on the substrate 9 to be reworked as indicated by arrow r7 in FIG. 16, for example, from the top of the page to the bottom then back to the top, and so on.

In the reworking unit 3, the liquid drop discharge units 31a, 31b, and 31c traverse above the defects 8 in the respective assignment areas by the following rework algorithm during the repeated reciprocating motion of the printhead gantry 306.

(1) A time is calculated which is taken for the ink discharge unit to relatively move from a first ink ejection target to another ink ejection target in a main scan direction (direction indicated by arrow r7) and an auxiliary scan direction (direction indicated by arrow r8).

(2) It is determined whether an auxiliary scan direction motion time (Tx) is less than or equal to a main scan direction motion time (Ty), and at least the determination is selected as a next ink ejection target or a candidate for the ink ejection target.

(3) Of the candidates for the next ink ejection target, the ink ejection target which is reachable in the shortest time from the first ink ejection target is determined as the next ink ejection target.

(4) The candidate which has ever been determined as an ink ejection target is excluded from a next determination.

This rework algorithm is a mere example. Another algorithm may be used.

The defect information storage section 41 in the rework determining unit 4 contains coordinate data for each defect 8 on the substrate 9 (28 defects in FIG. 16) in a coordinate system with respect to the substrate alignment marks. The assigning section 7 assigns each defect 8 to one of the liquid drop discharge units 31a, 31b, and 31c on the basis of assignment lines 93ab and 93bc for the substrate coordinates determined according to the movable areas of the three liquid drop discharge units 31a, 31b, and 31c (division thresholds in the substrate coordinates). As a result, the liquid drop discharge unit 31a is assigned the assignment area 92a on the substrate and the defects 8 (18 defects) in the area, the liquid drop discharge unit 31b is assigned the assignment area 92b on the substrate and the defects 8 (4 defects) in the area, and the liquid drop discharge unit 31c is assigned the assignment area 92c on the substrate and the defects 8 (6 defects) in the area.

The determining section 10 in the rework determining unit 4 uses the same algorithm as the rework algorithm above to determine a defect traversal sequence for each of the three assignment area 92a, 92b, and 92c. According to FIG. 16, in the assignment area 92a for the liquid drop discharge unit 31a, a traversal starts with the site a1 on a first end (top of the page) of the substrate 9 and moves to the site a2 on a second end (bottom of the page) of the substrate 9, the site a3 on the first end, the site a4 on the second end, and the site a5 on the first end where the traversal above all the assigned defects 8 is completed. The traversal corresponds to the printhead gantry 306 scanning the substrate four times (two rounds of reciprocation).

Similarly, in the assignment area 92b for the liquid drop discharge unit 31b, a traversal starts with the site b1 on the first end of the substrate and moves to the site b2 on the second end where the traversal above all the assigned defects 8 is completed. The traversal corresponds to the printhead gantry 306 scanning the substrate once (0.5 rounds of reciprocation). Similarly, in the assignment area 92c for the liquid drop discharge unit 31c, a traversal starts with the site c1 on the first end of the substrate and moves to the site c2 on the second end and the site c3 on the first end where the traversal above all the assigned defects 8 is completed. The traversal corresponds to the printhead gantry 306 scanning the substrate twice (one round of reciprocation).

The three liquid drop discharge units 31a, 31b, and 31c, sitting on the one printhead gantry 306, move together in the direction indicated by arrow r7. Therefore, for traversal above all the defects 8 of the substrate 9 shown in FIG. 16, the largest one of the scan counts required with the three liquid drop discharge units 31a, 31b, and 31c needs to be used. The printhead gantry 306 determines to scan four times (two rounds of reciprocation) as is required with the liquid drop discharge unit 31a.

Figure 17:
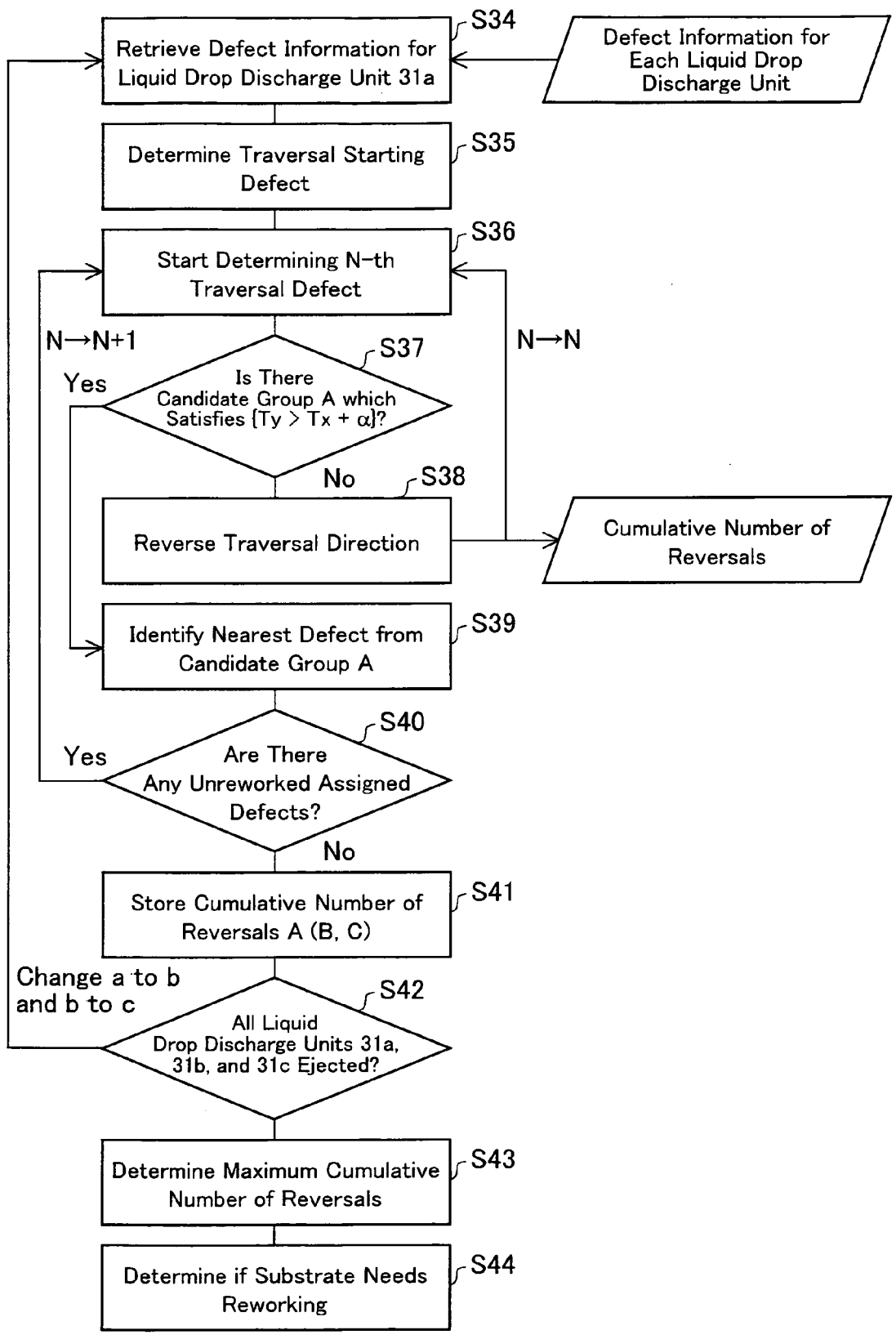
FIG. 17

FIG. 17 is a flow chart depicting, as an example, operation of the determining section 10. The determining section 10 first retrieves defect information for the liquid drop discharge unit 31a (step S34) and designates the defect located nearest an end of the substrate as a traversal starting defect (step S35). Next, determination of a second traversal defect is started from the end of the substrate toward the other end (step S36) to extract a candidate group A which meets $\{Ty>Tx+\alpha\}$ for the auxiliary scan direction motion time (Tx), the main scan direction motion time (Ty), and an identification parameter $\alpha$, such as the subsiding time (step S37). If there exists a candidate group A, a defect which has a minimum traveling distance is identified in the group and designated as a second defect (step S39). If there exists no defects which fall in the candidate group A, the direction of detecting which has been from the end of the substrate to the other end is reversed and a second traversal defect is determined again (step S38). After identifying the second defect (step S39), it is determined whether there are any assigned defects being left unreworked (step S40). If there are such defects, determination of an N-th traversal defect is started (step S36). If there are no such defects, the cumulative number of reversals A for the liquid drop discharge unit 31a is stored (step S41). Thereafter, similar steps are repeated in the liquid drop discharge units 31b and 31c to obtain the cumulative number of reversals B for the liquid drop discharge unit 31b and the cumulative number of reversals C for the liquid drop discharge unit 31c (step S42). Thereafter, a maximum cumulative number of reversals is identified from the cumulative numbers of reversals A, B, and C (step S43). It is then determine if the substrate needs reworking on the basis of the maximum cumulative number of reversals (step S44).

During the reworking, the printhead gantry 306 moves relative to the substrate 9 between the first and second ends of the substrate at constant speed. Therefore, the time required for one scan can be estimated from the constant speed and the traveling distance. Multiplying the time required for one scan by the required number of scans (maximum cumulative number of reversals) with the printhead gantry yields the estimated required rework time.

The estimated time required for the reworking is not necessarily obtained from the maximum cumulative number of reversals. Necessity for reworking may be determined from the maximum cumulative number of reversals. When this is the case, computation can be performed at high speed. It can be accurately and quickly determined whether each substrate needs reworking.

In the assignment area 92c, the first scan traverses above the defect 81a, the defect 81b, and the defect 81d and the second scan traverses above the defect 81c because the defect 81c cannot be reached after the defect 81b if the scan is performed based on the rework algorithm.

This determination algorithm determines a traversal sequence for the defects assigned for each of the liquid drop discharge units by the same algorithm as the traversal algorithm used by the reworking unit and determines a traversal sequence for each of the liquid drop discharge units prior to execution by the reworking unit. Thus, the required number of scans can be determined. By determining the number of scans, the time required for the reworking is precisely calculated. It becomes possible to determine whether the substrate needs reworking where the tact time can be rigorously manageable.

DETERMINATION EXAMPLE 6

Necessity for Reworking Determined from Non-ejection Time which is Estimated Using Rework Algorithm The determining section 10 uses the same traversal algorithm as the control section 33 uses in reworking the reworking unit 3 to estimate a traversal path for the defects assigned for each liquid drop discharge unit prior to actual reworking from the defect information contained in the defect information storage section 41 and the defect assignment information for each liquid drop discharge unit obtained from the assigning section 7, to calculate an ejection timing for each liquid drop discharge unit obtained from the traversal sequence, and to determine, if a maximum non-ejection time obtained from the ejection timing is greater than or equal to a predetermined threshold time value, that no processing is needed.

The rework determining unit 4 estimates a traversal path for the defects 8 by using a rework algorithm similarly to the determination example 5. According to FIG. 16, to traverse above all the defects 8 on the substrate 9, the printhead gantry 306 needs to scan the substrate 9 four times (one round of reciprocation). The liquid drop discharge unit 31b starts a traversal at the site b1 on the first end of the substrate and moves to the site b2 on the second end where the traversal above all the assigned defects 8 is completed. After that, while the printhead gantry is moving from the site b2 on the second end to the site b3 on the first end, the site b4 on the second end, and the site b5 on the first end, the liquid drop discharge unit 31b does not traverse over the defects 8. The liquid drop discharge unit 31c starts a traversal at the site c1 on the first end of the substrate and reaches the site c2 on the second end and then the site c3 on the first end where the traversal above all the assigned defects 8 is completed. After that, while the printhead gantry is moving from the site c3 on the first end to the site c4 on the second end and the site c5 on the first end, the liquid drop discharge unit 31c does not traverse over the defects 8.

The liquid drop discharge unit ejects liquid drops when traversing over the defects 8 in the reworking operation. Therefore, the period when the traversal is moving from one defect 8 to the next is a non-ejection time (distance in the direction indicated by arrow r7 divided by the scan speed). In other words, in the liquid drop discharge unit 31c, the value obtained by dividing the distance in the direction indicated by arrow r7 from the defect 81a to the defect 81b by the scan speed is the non-ejection time between the ejection timing for the defect 81*a* and the ejection timing for the defect 81*b*. A maximum non-ejection time is the period until the printhead gantry reaches the site c5 on the first end of the substrate after ejection to the end defect 81*c* is completed.

If the liquid drop discharge unit stands by in non-ejection state for an extended period of time, the viscosity of the correction liquid rises near the nozzle holes. The increased viscosity could be a cause for inconveniences. The unit may not be able to eject correction liquid in next substrate reworking. If the unit can eject correction liquid, the liquid may not land at a desired position. In either case, the unit is not able to dispense correction liquid dropwise to desired defective pixels.

This determination algorithm is able to accurately determine in advance not to rework the substrate which could lead to improper ejection by the liquid drop discharge unit. The algorithm provides stability to the reworking by the reworking unit.

Another determination example is a substrate with a highly linear defect layout. If defects are concentrated along or near a straight line on a substrate, the substrate cannot be used even after reworking. The substrate is therefore not reworked.

The aforementioned example dealt with defective pixels in the CF panel, as an example. This is by no means intended to limit the present invention. The present invention is also applicable to the manufacture of the electroluminescence (EL) display device which has a matrix or stripes of sections to which liquid drops are to be ejected. The present invention is also applicable to manufacture of a back substrate for the plasma display device. The present invention is also applicable to manufacture of an image display device including electron discharge elements and the manufacture of wires.

Embodiment 2

Figure 18:
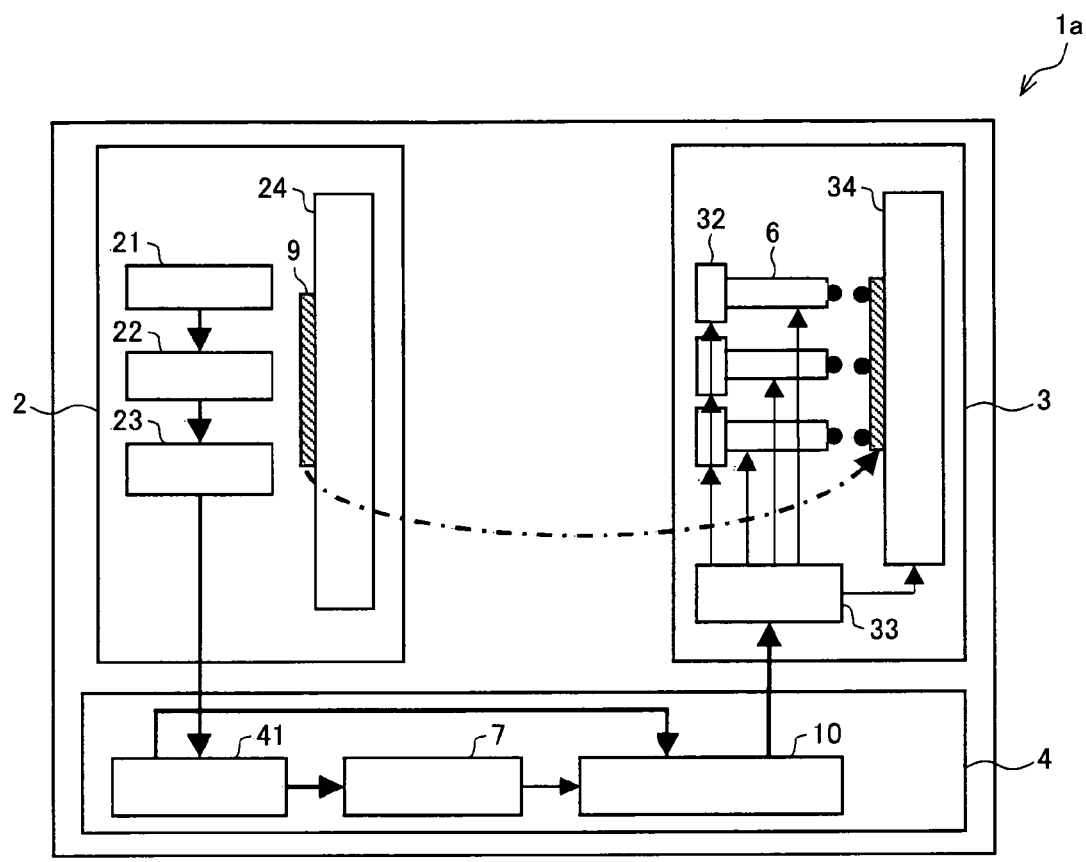
FIG. 18
Figure 19:
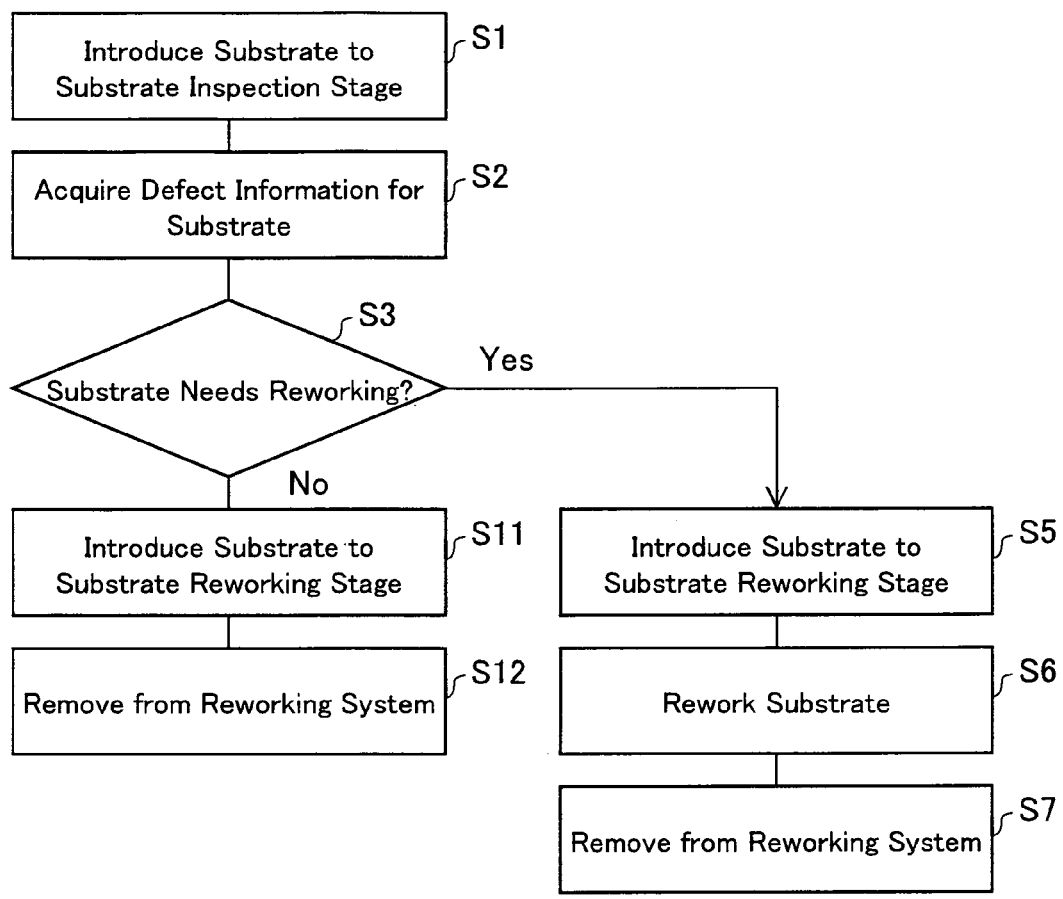
FIG. 19

FIG. 18 is a schematic illustration of another substrate reworking system in accordance with the present invention. FIG. 19 is a flow chart for the system. The substrate reworking system 1*a* differs from embodiment 1 in that the system 1*a* includes no substrate sorting section 51 or no defective substrate storage section 52. For convenience, members of the present embodiment that have the same arrangement and function as members of embodiment 1, and that are mentioned in that embodiment are indicated by the same reference numerals and description thereof is omitted.

In the substrate reworking system 1*a* of embodiment 2, after being inspected by the defect information acquisition unit 2, the substrate 9 on the substrate inspection stage 24 is without any intervening steps handed over to the substrate reworking stage 34 in the reworking unit 3. This is made possible by, for example, structuring the substrate inspection stage 24 and the substrate reworking stage 34 like a belt conveyor and positioning them close together. Alternatively, an ordinary transport means, such as substrate transport robots, may be used to transport the substrate 9 from the substrate inspection stage 24 to the substrate reworking stage 34 regardless the determination as to whether the substrate needs reworking.

The determination information obtained by the determining section 10 as to whether the substrates need reworking is sent to the control section 33 in the reworking unit 3. If it is determined that the substrate needs no reworking, the substrate is removed from the substrate reworking system 1*a* without being reworked by the reworking unit 3.

The arrangement above enables the defect information acquisition unit 2 to single-handedly acquire defect information substantially across the entire region on the target substrate 9 so that the rework determining unit 4 can determine from the defect information whether each substrate needs reworking. The substrate 9 that should not be reworked is not reworked. Rework efficiency is thus improved.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to substrate reworking systems with a reworking function whereby rework sites scattered across a substrate are reworked by inkjet technology, and also to associated substrate reworking methods, computer programs, and computer-readable storage media.

The invention claimed is:

1. A substrate reworking system, comprising:
   defect information acquisition means for acquiring defect information for an entire region on a target substrate;
   reworking means including at least one liquid drop ejection means for dispensing a liquid drop to a defective part on the target substrate based on the defect information acquired by the defect information acquisition means; and
   rework determining means for determining, based on the defect information acquired by the defect information acquisition means, whether the reworking means needs to perform reworking and whether the target substrate should be reworked,
   wherein:
   the rework determining means includes: identifying means for identifying a defect to be reworked by the liquid drop ejection means based on the defect information; and calculation means for estimating a time interval between a first ejection timing and a next, second ejection timing for the liquid drop ejection means; and
   the rework determining means determines, based on the time interval, whether the reworking is needed.

2. The substrate reworking system as set forth in claim 1, wherein:
   the liquid drop ejection means comprises a plurality of individual moveable liquid drop ejection means; and
   the rework determining means includes assigning means for distributing the defect information acquired by the defect information acquisition means among the plurality of liquid drop ejection means and determining means for determining, based on the defect information distributed by the assigning means, whether the reworking is needed.

3. The substrate reworking system as set forth in claim 2, wherein the rework determining means determines, based on an assigned defect count per liquid drop ejection means, whether the reworking is needed.

4. The substrate reworking system as set forth in claim 1, further comprising substrate transport means including:
   first transport means for transporting the target substrate from the defect information acquisition means to the reworking means; and
   second transport means for transporting the target substrate from the defect information acquisition means to defective substrate storage means, wherein the substrate transport means selects the first transport means and the second transport means based on a result of the determination made by the rework determining means.

5. The substrate reworking system as set forth in claim 1, wherein the rework determining means determines, based on either a defect count or a maximum defect concentration in the target substrate calculated from the defect information, whether the reworking is needed.

6. The substrate reworking system as set forth in claim 1, wherein the rework determining means determines, based on a rework time of the reworking means estimated based on the defect information, whether the reworking is needed.

7. A method of reworking a substrate, comprising:
a defect information acquisition step for acquiring defect information for an entire region on a target substrate;
a rework determining step for determining, based on the defect information, whether the target substrate needs to be reworked and whether the target substrate should be reworked; and
a reworking step including at least one liquid drop ejection step for dispensing, based on the defect information, the liquid drop to a defective part on the target substrate determined to need to be reworked,
wherein:
the rework determining step includes: an identifying step for identifying a defect to be reworked by the liquid drop ejection step based on the defect information; and a calculation step for estimating a time interval between a first ejection timing and a next, second ejection timing for the liquid drop ejection steps; and
the rework determining step determines, based on the time interval, whether the reworking is needed.

8. A non-transitory computer-readable storage medium, containing a program for implementing, on a computer:
a defect information acquisition step for acquiring defect information for an entire region on a target substrate;
a rework determining step for determining, based on the defect information, whether the target substrate needs to be reworked and whether the target substrate should be reworked; and
a reworking step including at least one liquid drop ejection step for dispensing, based on the defect information, the liquid drop to a defective part on the target substrate determined to need to be reworked,
wherein:
the rework determining step includes: an identifying step for identifying a defect to be reworked by the liquid drop ejection step based on the defect information; and a calculation step for estimating a time interval between a first ejection timing and a next, second ejection timing for the liquid drop ejection step; and
the rework determining step determines, based on the time interval, whether the reworking is needed.

* * * * *